US012166311B2

(12) United States Patent
Scanzillo et al.

(10) Patent No.: US 12,166,311 B2
(45) Date of Patent: Dec. 10, 2024

(54) AUXILIARY CONTACTS FOR INDUSTRIAL CONNECTORS

(71) Applicant: Hubbell Incorporated, Shelton, CT (US)

(72) Inventors: Thomas Louis Scanzillo, Monroe, CT (US); William Henry Dietz, Branford, CT (US)

(73) Assignee: Hubbell Incorporated, Shelton, CT (US)

( * ) Notice: Subject to any disclaimer, the term of this patent is extended or adjusted under 35 U.S.C. 154(b) by 626 days.

(21) Appl. No.: 17/295,731

(22) PCT Filed: Nov. 21, 2019

(86) PCT No.: PCT/US2019/062530

§ 371 (c)(1),
(2) Date: May 20, 2021

(87) PCT Pub. No.: WO2020/112472

PCT Pub. Date: Jun. 4, 2020

(65) Prior Publication Data

US 2022/0006233 A1 Jan. 6, 2022

Related U.S. Application Data

(60) Provisional application No. 62/773,528, filed on Nov. 30, 2018.

(51) Int. Cl.
*H01R 13/53* (2006.01)
*H01R 13/502* (2006.01)
(Continued)

(52) U.S. Cl.
CPC ........... *H01R 13/53* (2013.01); *H01R 13/502* (2013.01); *H01R 13/631* (2013.01); *H01R 24/005* (2013.01); *H01R 24/86* (2013.01)

(58) Field of Classification Search
CPC .... H01R 13/53; H01R 13/502; H01R 13/631; H01R 24/005; H01R 24/86; H01R 2107/00; H01R 24/58
See application file for complete search history.

(56) References Cited

U.S. PATENT DOCUMENTS 4,678,254 A 7/1987 Le Magourou
8,905,790 B2 12/2014 Staudigel
(Continued)

OTHER PUBLICATIONS

Search Report and Written Opinion mailed in PCT/US/19/62530 on Feb. 7, 2020 (10 pages).
(Continued)

*Primary Examiner* — Michael C Zarroli
(74) *Attorney, Agent, or Firm* — Wissing Miller LLP

(57) ABSTRACT

Disclosed is an auxiliary contact assembly for an industrial connector, such as an electrical plug and electrical receptacle. The receptacle has a line side contact assembly formed by a cavity elongated in a proximal direction with an open distal end, and a plurality of inner side surfaces. A plurality of line side contacts are arranged on the inner side surfaces of the cavity. At least two of the line side contacts are on separate non-adjacent inner side surfaces at a first distance from the distal end of the cavity and at least one of the plurality of line side contacts is on an intervening inner side surface between the separate non-adjacent inner side surfaces and at a second distance from the distal end so that the contacts are staggered along the length of the cavity. The plug includes a load side contact assembly formed by a support body having a plurality of outer side surfaces that is elongated in the proximal direction. The support body is shaped to be inserted into the cavity with the outer side surfaces of the support body corresponding with the inner side surfaces of the cavity. The load side contact assembly has a plurality of load side contacts positioned to contact
(Continued)

1 corresponding ones of the plurality of line side contacts when the support body is inserted into the cavity.

18 Claims, 23 Drawing Sheets

(51) Int. Cl.

| | |
|---|---|
| ***H01R 13/631*** | (2006.01) |
| ***H01R 24/00*** | (2011.01) |
| ***H01R 24/86*** | (2011.01) |

(56) References Cited

U.S. PATENT DOCUMENTS

| | | | | |
|---|---|---|---|---|
| 8,911,262 | B1 | 12/2014 | Leiba et al. | |
| 9,685,742 | B2 * | 6/2017 | Liu | H01R 13/7037 |
| 9,899,767 | B1 | 2/2018 | Juds et al. | |
| 2003/0228791 | A1 | 12/2003 | Milan | |
| 2006/0183368 | A1 * | 8/2006 | Kim | H01R 24/58<br>439/502 |
| 2010/0087096 | A1 | 4/2010 | Sloey et al. | |
| 2015/0099391 | A1 * | 4/2015 | Hashimoto | H01R 13/629<br>439/380 |
| 2017/0018872 | A1 | 4/2017 | Rollmann et al. | |
| 2017/0172652 | A1 * | 6/2017 | Govari | H01R 24/68 |

OTHER PUBLICATIONS

International Preliminary Report on Patentability issued in PCT/US19/62530 on May 25, 2021 (5 pages).

* cited by examiner

200

AUXILIARY CONTACTS FOR INDUSTRIAL CONNECTORS

This application is a 371 of PCT/US19/62530 filed on Nov. 21, 2019, published on Jun. 4, 2020 under publication number WO/2020/112472, which claims priority benefits from U.S. Provisional Patent Application No. 62/773,528, filed on Nov. 30, 2018. The disclosure of each of those applications is incorporated herein by reference.

BACKGROUND

Field

The present disclosure relates to auxiliary contacts for industrial electrical connectors. In particular, the present disclosure describes auxiliary contact assemblies that can be integrated with load and line electrodes on an industrial plug and receptacle where the auxiliary contact assembly provides a plurality of contacts arranged radially and longitudinally on an elongated body.

Description of the Related Art

Industrial electrical connectors generally consist of a plug, including a number of male load power electrodes and a receptacle including a number of recessed female line power electrodes. The load and line electrodes are configured to deliver power to and from industrial equipment such motors, pumps, generators, compressors, and the like. Such connectors are often designed to deliver significant amounts of power and/or current, e.g. hundreds of horsepower or amps. Load and line electrodes must be sufficiently large to safely handle this power and must be spaced sufficiently far from one another in the plug and receptacle to prevent arcing and to minimize leakage of current.

In some cases, communication, control, and/or monitoring signals need to be communicated to and from the equipment, for example, to monitor and control the speed of a motor or to indicate alarm condition. Some industrial connectors include low-voltage butt-end connectors spaced apart from the load electrodes. These low-voltage connectors are referred to as auxiliary contact sets. When the plug and receptacle are joined, the line electrodes in the receptacle provide current to the load electrodes in the plug on the equipment and the auxiliary contacts provide a path for low-voltage signals, e.g., computer data packets, to pass to and from the equipment. Because load and line electrodes handle large amounts of current and may be subject to significant fluctuations in power demand, they can generate significant electrical noise. Thus, the auxiliary contacts must be positioned a sufficient distance from the load electrodes to ensure that control signals are reliably communicated. Because load and control electrodes are relatively large and must be space apart from auxiliary contacts, this limits the number of low-voltage butt-end connectors that can be accommodated on the plug and receptacle.

To ensure that control signals are reliably communicated, it may be desirable to provide redundant auxiliary contacts. Redundant contacts may be used to provide additional control and monitoring information, provide a means for error checking of the control signal, or provide a back-up channel for critical signals such as alarms. Spacing and size requirements for primary line/load power conductors limits the maximum size and achievable density for auxiliary contacts due to minimum dielectric spacing requirements.

Industrial connectors often conform to industry standard load/line power electrode configurations. This allows plugs and receptacles made by different manufacturers to interconnect. For example, a generator made by one manufacturer can be connected with a load panel made by another manufacturer, provided both manufacturers conform their connectors to the same standard configuration. Typically, the interoperability of standardized connectors is a benefit for customers but a constraint for designers attempting to include multiple auxiliary contacts inside industrial products with pre-existing form factors.

Using standardized connectors may be cost effective for an equipment manufacturer compared with designing and manufacturing a customized connector set. This, however, constrains the number and configuration of auxiliary connectors. Moreover, many applications require specific timing of auxiliary contacts to "make & break" relative to the timing of the connection of line power. For example, it may be necessary that auxiliary connections that carry control data are established before power is applied to the equipment. Providing this flexibility complicates a design solution and may preclude the use of an off-the-shelf connector, thus raising costs.

SUMMARY

The present disclosure relates to apparatuses and methods to address these difficulties.

According to one embodiment there is provided an auxiliary contact assembly for an industrial connector comprising a first contact assembly comprising a cavity elongated in a longitudinal direction, having a proximal end, and having a plurality of inner side surfaces, and a plurality of first contacts arranged on the inner side surfaces of the cavity, wherein at least two of the first contacts are on separate non-adjacent inner side surfaces at a first distance from the proximal end of the cavity and wherein at least one of the plurality of first contacts is on an inner side surface between the separate non-adjacent inner side surfaces and at a second distance from the proximal end. The assembly also comprises a second contact assembly comprising a support body having a plurality of side surfaces and being elongated in the longitudinal direction, wherein the support body is shaped to be inserted into the cavity and wherein the sides surface of the support body correspond with the inner side surfaces of the cavity and a plurality of second contacts are arranged on one or more side surfaces of the body and positioned to contact the first contacts when the support body is inserted into the cavity.

According to a further embodiment the cavity comprises six inner side surfaces, wherein a first set of three of the first contacts are on three non-adjacent inner side surfaces at the first distance from the proximal end, wherein a second set of three first contacts are on the three remaining inner side surfaces at the second distance from the proximal end.

According to another embodiment the first contacts comprise leaf springs, and when the body is inserted into the cavity, the second contacts deflect the leaf springs.

According to another embodiment the assembly further comprises a plurality of first wires connected with the first contacts and a plurality second wires connected with the second contacts. The assembly may further comprise a housing surrounding the cavity, an electrical plug including a first facing surface connected with the support body, wherein the support body extends from the first facing surface of the plug, one or more load electrodes extending from the first facing surface parallel to the support body, an electrical receptacle including a second facing surface and supporting the housing, and one or more line electrodes, wherein the housing and the line electrodes are recessed from a second facing surface of the receptacle, wherein when the first facing surface is moved toward the second facing surface the load electrodes insert into the line electrodes and the support body inserts into the cavity, and wherein the load electrodes contact the line electrodes and the first contacts contact the second contacts. According to one aspect of this embodiment as the first facing surface approaches the second facing surface, the load and line electrodes contact each other before the first and second contacts contact each other. According to another aspect of this embodiment as the first facing surface approaches the second facing surface, the load and line electrodes contact each other after the first and second contacts contact each other. According to a still further aspect of this embodiment the at least two first contacts form a first contact set and the at least one first contact forms a second contact set, and, as the first facing surface approaches the second facing surface, the load and line electrodes contact each other after the contacts of the first contact set contact their respective second contacts and the load and line electrodes contact each other before the contacts of the second contact set contact their respective second contacts. According to another embodiment, the line and load electrodes conform to an industry standard configuration.

According to yet another embodiment, there is provided an auxiliary contact assembly for an industrial connector comprising a line side contact assembly and a load side contact assembly. The line side contact assembly comprises a cavity elongated in a proximal direction, having an open distal end, and having a plurality of inner side surfaces. A plurality of line side contacts are arranged on the inner side surfaces of the cavity. At least two of the line side contacts are on separate non-adjacent inner side surfaces at a first distance from the distal end of the cavity and at least one of the plurality of line side contacts is on an intervening inner side surface between the separate non-adjacent inner side surfaces and at a second distance from the distal end. The load side contact assembly comprises a support body having a plurality of outer side surfaces and is elongated in the proximal direction. The support body is shaped to be inserted into the cavity. The outer side surfaces of the support body correspond with the inner side surfaces of the cavity. The plurality of load side contacts are arranged on one or more outer side surfaces of the body and positioned to contact the line side contacts when the support body is inserted into the cavity. The cavity may comprise six inner side surfaces with a first set of three of the line side contacts on three non-adjacent inner side surfaces at the first distance from the distal end and a second set of three line side contacts that are on the three remaining inner side surfaces at the second distance from the distal end. The line side contacts may comprise leaf springs and, when the body is inserted into the cavity, the load side contacts deflect the leaf springs.

The assembly may further comprise a plurality of line side wires connected with the line side contacts and a plurality load side wires connected with the load side contacts. The line side wires may be connected with the line side contacts by spade connectors with the spade connectors on the contacts at the first distance from the distal end being offset in the distal direction from the spade connectors on the contacts at the second distance from the distal end.

According to one aspect, the cavity further comprises a first set of hook engaging slots with at least two of the slots disposed on the non-adjacent inner sides and at least one slot disposed on the intervening inner side. The line side contacts may each further comprise a hook with the hooks of the line side contacts engaged with respective ones of the slots.

According to another aspect the auxiliary contact assembly includes an electrical plug and an electrical receptacle. The plug comprises a load side housing and a load side contacting surface disposed across a portion of the housing. The load side contacting surface supports the support body and the support body extends from the contacting surface in the proximal direction. One or more load electrodes extend from the load side contacting surface in the proximal direction parallel to the support body. The electrical receptacle comprises a line side contacting surface. The open distal end of the cavity forms an opening in the line side contacting surface and with the cavity extending in the proximal direction from the line side contacting surface. The receptacle also comprises one or more line electrodes that are disposed proximal of the line side contacting surface. One or more electrode openings in the line side contacting surface are aligned with and disposed distal of corresponding ones of the line electrodes. When the load side contacting surface is moved toward the line side contacting surface the load electrodes insert into the electrode openings and the support body inserts into the cavity so that the load electrodes contact the line electrodes and the load side contacts contact the line side contacts.

According to another aspect, as the load side contacting surface approaches the line side contacting surface, the load and line electrodes contact each other before the load side contacts and the line side contacts contact each other. According to another aspect, as the load side contacting surface approaches the line side contacting surface, the load and line electrodes contact each other after the load side contacts and the line side contacts contact each other.

According to yet another aspect, at least two load side contacts form a first load side contact set and at least one load side contact forms a second load side contact set. As the load side contacting surface approaches the line side contacting surface, the load and line electrodes contact each other after the contacts of the first load side contact set contact their respective line side contacts and the load and line electrodes contact each other before the contacts of the second load side contact set contact their respective line side contacts.

The line and load electrodes may conform to an industry standard configuration. The load side contact assembly may be removably connected with the plug. The line side contact assembly may be removably connected with the receptacle. The cavity of the line side contact assembly may further comprise a line side alignment feature extending in the proximal direction and disposed between two adjacent inner side surfaces, and the support body may further comprises a load side alignment feature extending in the proximal direction and disposed between adjacent outer side surfaces so that when the supporting body is inserted into the cavity, the load side alignment feature engages with the line side alignment feature to guide the load side contacts into engagement with the line side contacts.

According to anther embodiment, there is provided an electrical receptacle comprising a line side contact assembly with a cavity elongated in a longitudinal direction having an open distal end. The cavity has a plurality of inner side surfaces and a plurality of line side contacts arranged on the inner side surfaces of the cavity. At least two of the line side contacts are on separate non-adjacent inner side surfaces at a first distance from the distal end of the cavity and at least one of the plurality of line side contacts is on an inner side surface between the separate non-adjacent inner side surfaces and at a second distance from the distal end. The receptacle includes a housing surrounding the line side contact assembly and a line side contacting surface disposed across a portion of the housing. The open distal end of the cavity forms an opening in the line side contacting surface and the cavity extends in the proximal direction from the line side contacting surface. The receptacle also includes one or more line electrodes disposed within the housing proximal of the line side contacting surface and one or more electrode openings in the line side contacting surface. The electrode openings correspond to respective ones of the line electrodes. The receptacle may have a plurality of line electrodes, wherein the open distal end of the cavity is positioned in the center of the housing and the electrode openings are positioned radially around the open distal end. The line side contact assembly may be removably connected with the receptacle.

According to another embodiment, there is provided an electrical plug with a load side contact assembly. The load side contact assembly comprises a support body with a plurality of outer side surfaces. The support body has a proximal end and is elongated in the proximal direction. A plurality of load side contacts are arranged on the outer side surfaces of the body. At least two of the load side contacts are on separate non-adjacent outer side surfaces at a first distance from the proximal end of the body and at least one of the plurality of load side contacts is on an outer side surface between the separate non-adjacent outer side surfaces and at a second distance from the proximal end. The plug includes a load side contacting surface. The body extends normal to the load side contacting surface in the proximal direction. The plug also includes one or more load electrodes extending normal to the load side contacting surface in the proximal direction.

The plug may comprise a plurality of load electrodes with the support body positioned in the center of the load side contacting surface and the load electrodes positioned radially around the support body. The load side contact assembly may be removably connected with the plug.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
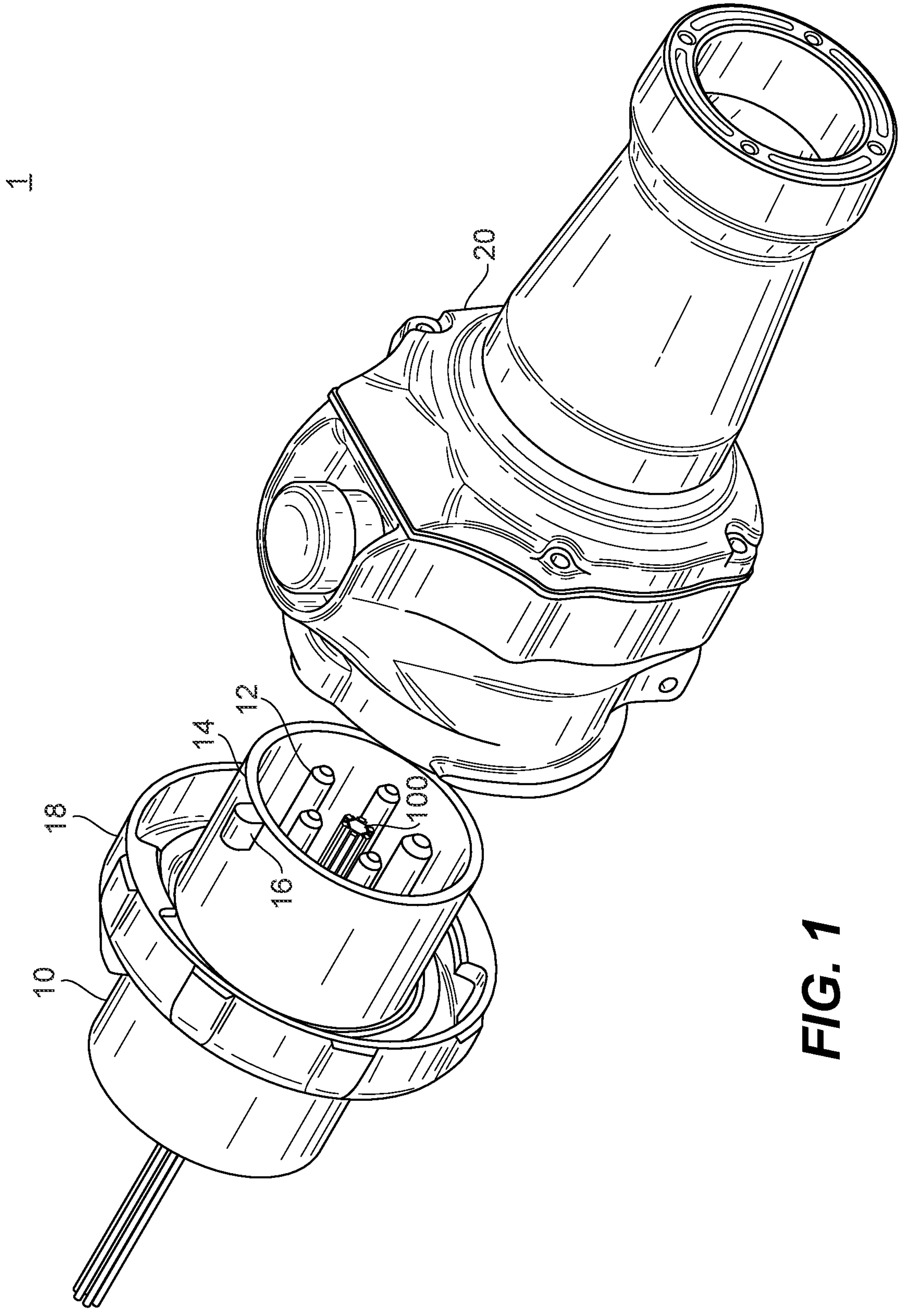
FIG. 1 is a perspective view of a plug and receptacle including an auxiliary contact assembly according to an embodiment of the disclosure.
Figure 2:
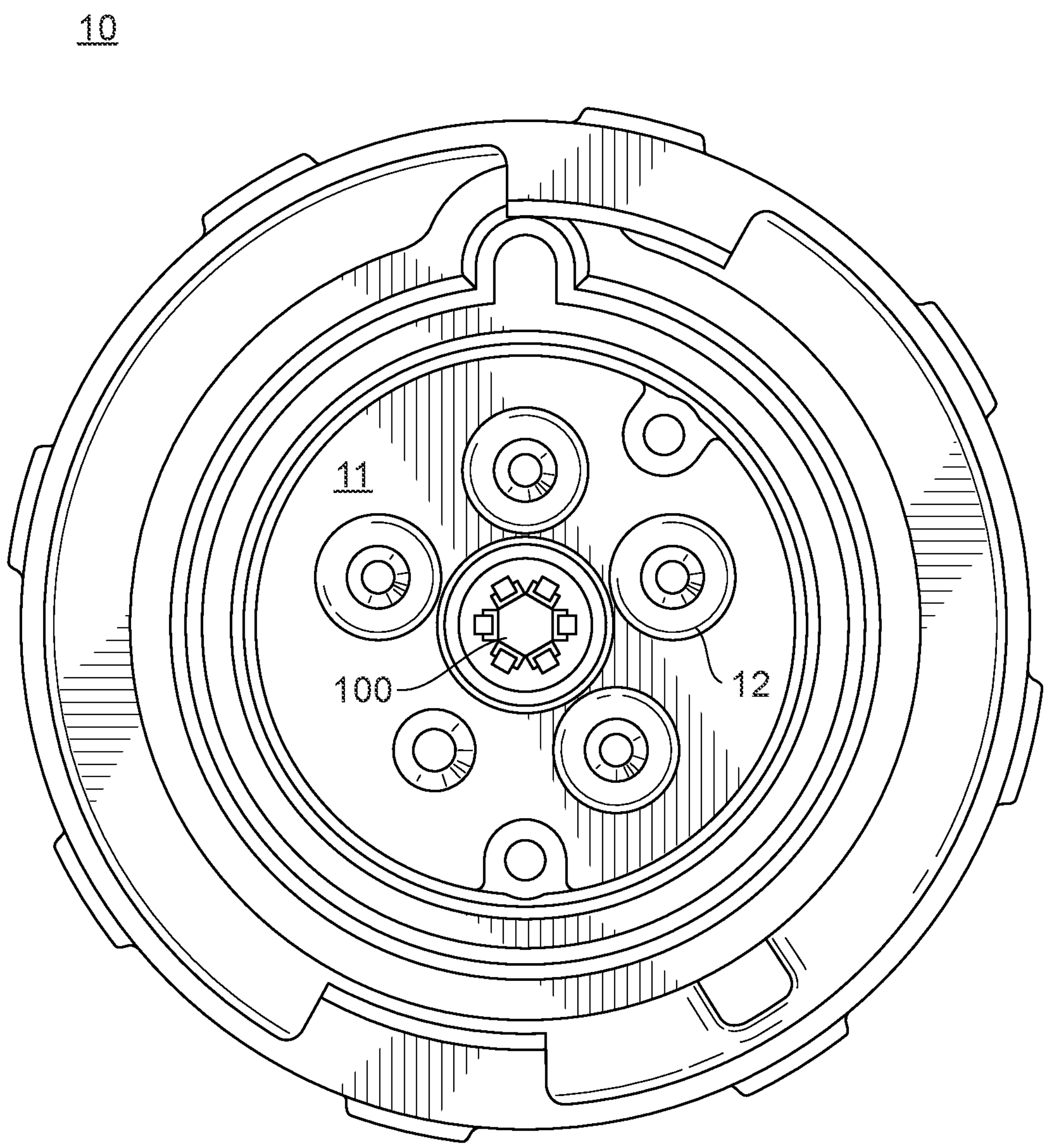
FIG. 2 shows a front view of a plug including an auxiliary contact assembly according to an embodiment of the disclosure.

FIG. 1 shows a plug 10 and receptacle 20 for an industrial connector assembly 1 according to an embodiment of the disclosure. Plug 10 includes a plurality of load power electrodes 12 surrounded by a collar 14. A key 16 is positioned on the collar at a predetermined angular position in relation to load power electrodes 12. Locking ring 18 is rotatably positioned around collar 14. As shown in FIGS. 1 and 2, load power electrodes 12 extend perpendicular from facing surface 11 and are parallel to one another. Load-side auxiliary contact assembly 100 extends parallel with load power electrodes 12. According to one embodiment, assembly 100 is located along the centerline of plug 10 with load power electrodes 12 positioned around the assembly. According to other embodiments, assembly 100 and power electrodes 12 are located at different locations with respect to one another on facing surface 11. According to a further embodiment, the shape and arrangement of load power electrodes 12 conforms to an industry standard plug configuration.

Figure 3:
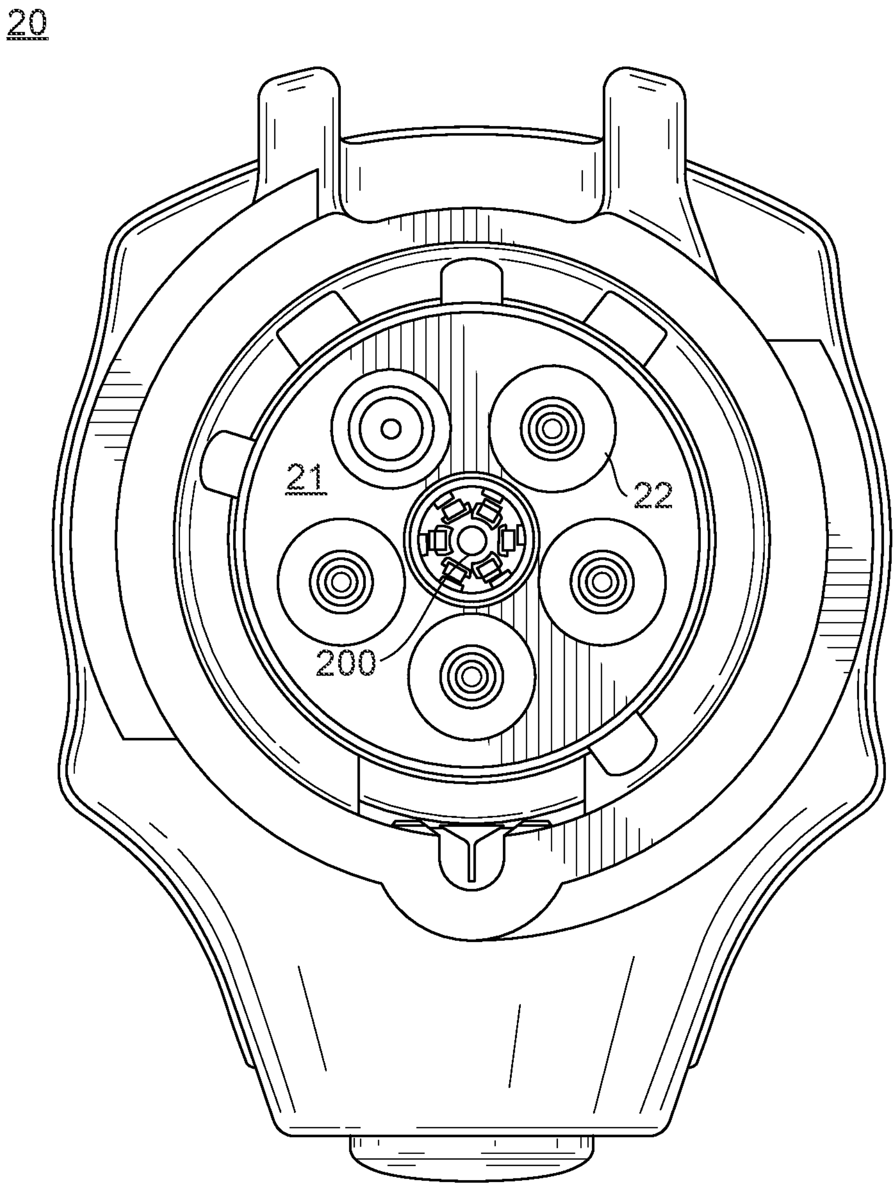
FIG. 3 shows a front view of a receptacle including an auxiliary contact assembly according to an embodiment of the disclosure.

FIG. 3 shows receptacle 20 having facing surface 21 with a plurality of line power electrode openings 22 into the receptacle. As will be explained more fully below, load power electrodes 12 fit through line power electrode openings 22 and connect with contact mechanisms located within the receptacle to provide electrical power to the equipment. Line-side auxiliary contact assembly 200 is positioned within receptacle 20 below surface 21. When load power electrodes 12 are fitted into line power electrode openings 22, load-side auxiliary contact assembly 100 fits into line-side auxiliary contact assembly 200.

Figure 4:
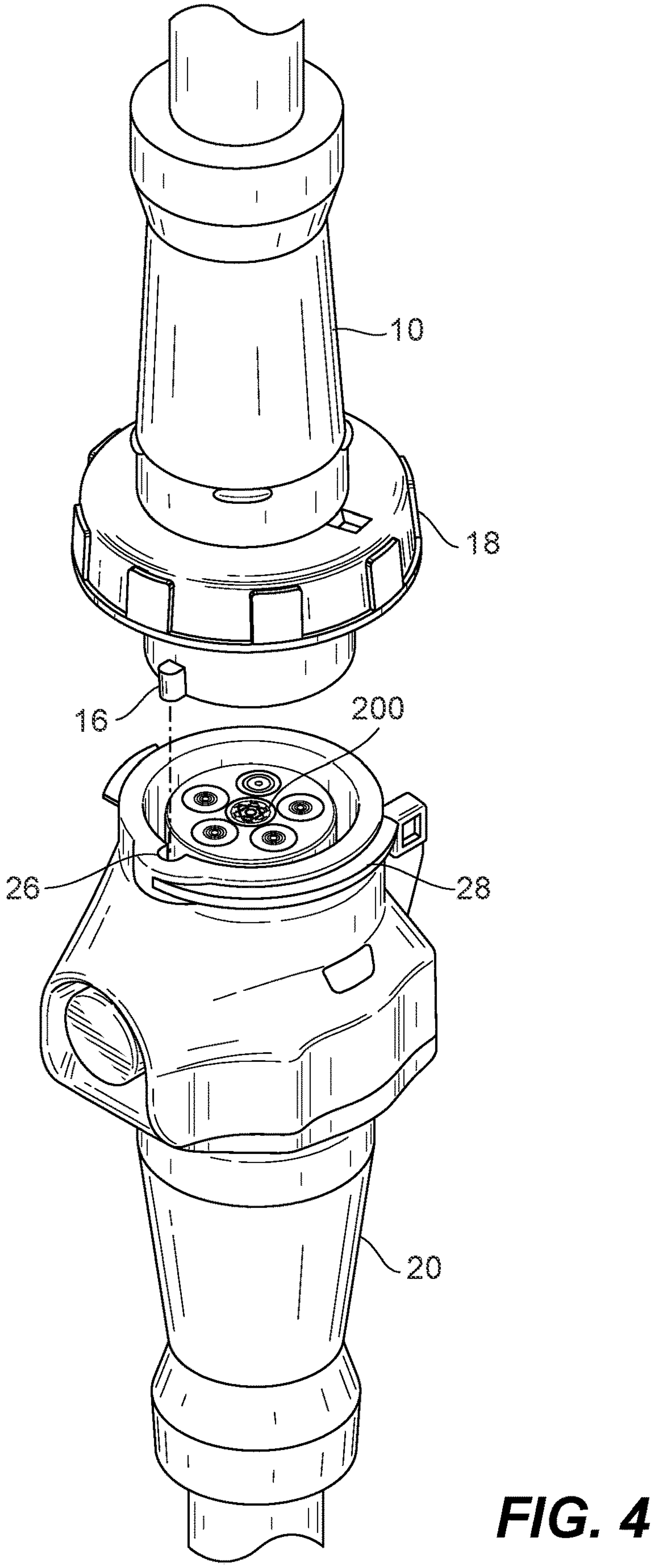
FIG. 4 is a perspective view of a plug and receptacle including an auxiliary contact assembly according to an embodiment of the disclosure.

As shown in FIG. 4, receptacle 20 include key slot 26. Plug 10 is engaged with receptacle 20 by aligning key 16 with key slot 26. When the key and key slot are aligned, load power electrodes 12 align with line power electrode openings 22. Also, as will be explained below, load-side auxiliary contact assembly 100 and line-side auxiliary contact assembly 200 are oriented so that they fit together. Once key 16 and key slot 26 are aligned, plug 10 is pushed toward receptacle 20 to connect a piece of industrial equipment (i.e., the load) with a source of electrical power (i.e., the line). This also engages load-side auxiliary contact assembly 100 with line-side auxiliary contact assembly 200. According to one embodiment, locking ring 18 on plug 10 is rotated to engage with thread 28 on receptacle 20 to secure the plug with the receptacle. The disclosure is not limited to plugs including this locking arrangement. Other types of industrial connectors are also within the scope of the disclosure.

Figure 5:
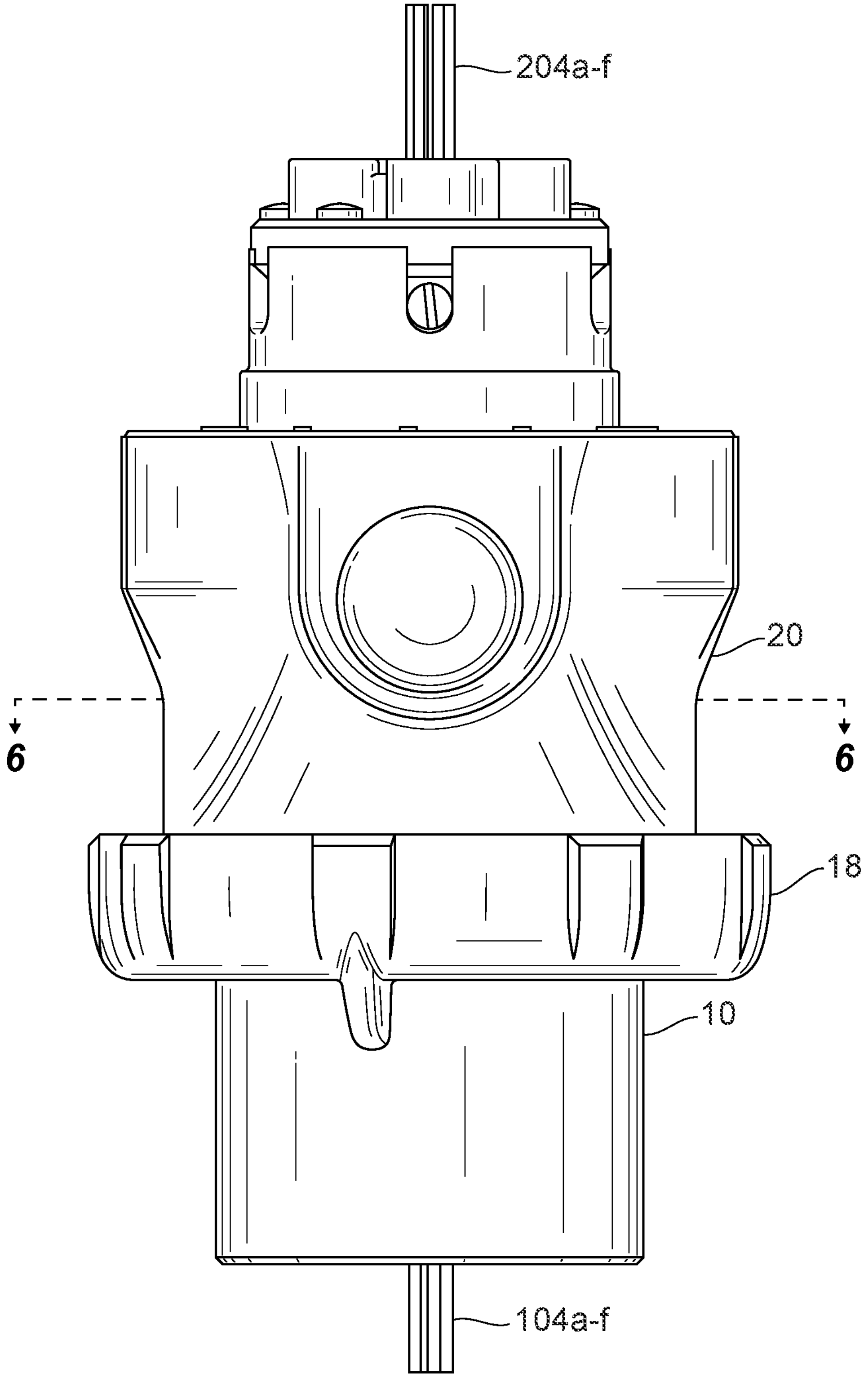
FIG. 5 is a side view of a plug and receptacle including an auxiliary contact assembly according to an embodiment of the disclosure.

FIG. 5 shows plug 10 engaged with receptacle 20. Pigtail leads 104*a-f* and 204*a-f* on plug 10 and receptacle 20, respectively, extend from the load-side and line-side auxiliary contact assemblies 100, 200 and are connected with monitoring and controlling circuitry, for example, to communicate process conditions, alarm conditions, and the like to and from the equipment. Electrical cables (not shown) are connected with the plug and receptacle to conduct electrical power between the line and the load.

Figure 7:
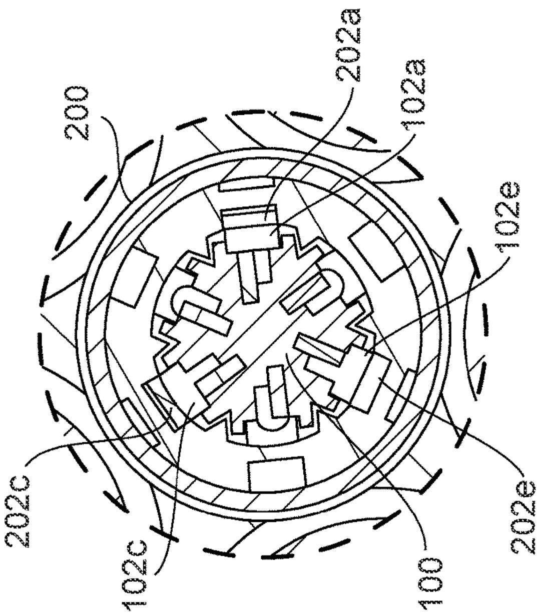
FIG. 7 is a detailed view of a portion of the cross section of FIG. 6.
Figure 6:
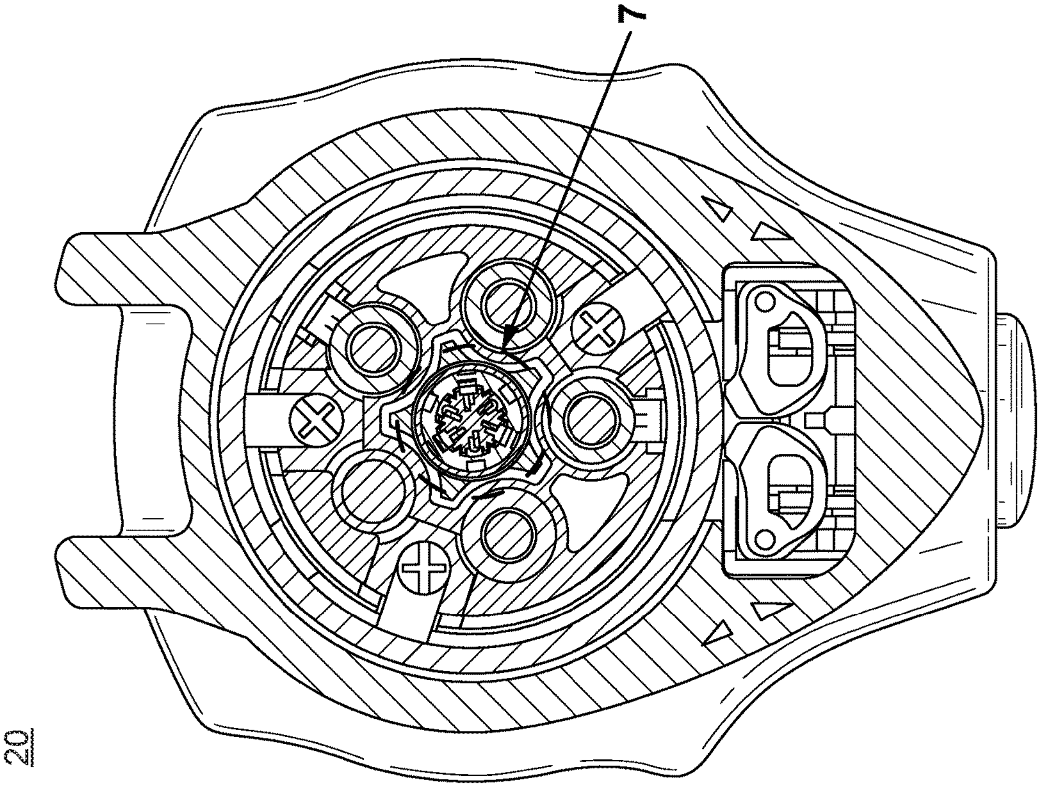
FIG. 6 is a cross section view of a plug and receptacle including an auxiliary contact assembly according to an embodiment of the disclosure.

FIG. 6 shows a cross-section of the plug 10 and receptacle 20 connected together in FIG. 5. FIG. 7 shows a detailed view of the load-side auxiliary contact assembly 100 engaged with the line-side auxiliary contact assembly 200. In this view, load-side auxiliary contacts 102*a*, 102*c*, and 102*e* engage with respective line-side auxiliary contacts 202*a*, 202*c*, and 202*e* to communicate signals to and from the equipment. Load-side contacts 102*b*, 102*d*, and 102*f* engage with line-side contacts 202*b*, 202*d*, and 202*f* on a plane that is offset from the one shown in cross sections in FIGS. 6 and 7 and are not visible in these figures.

Figure 8:
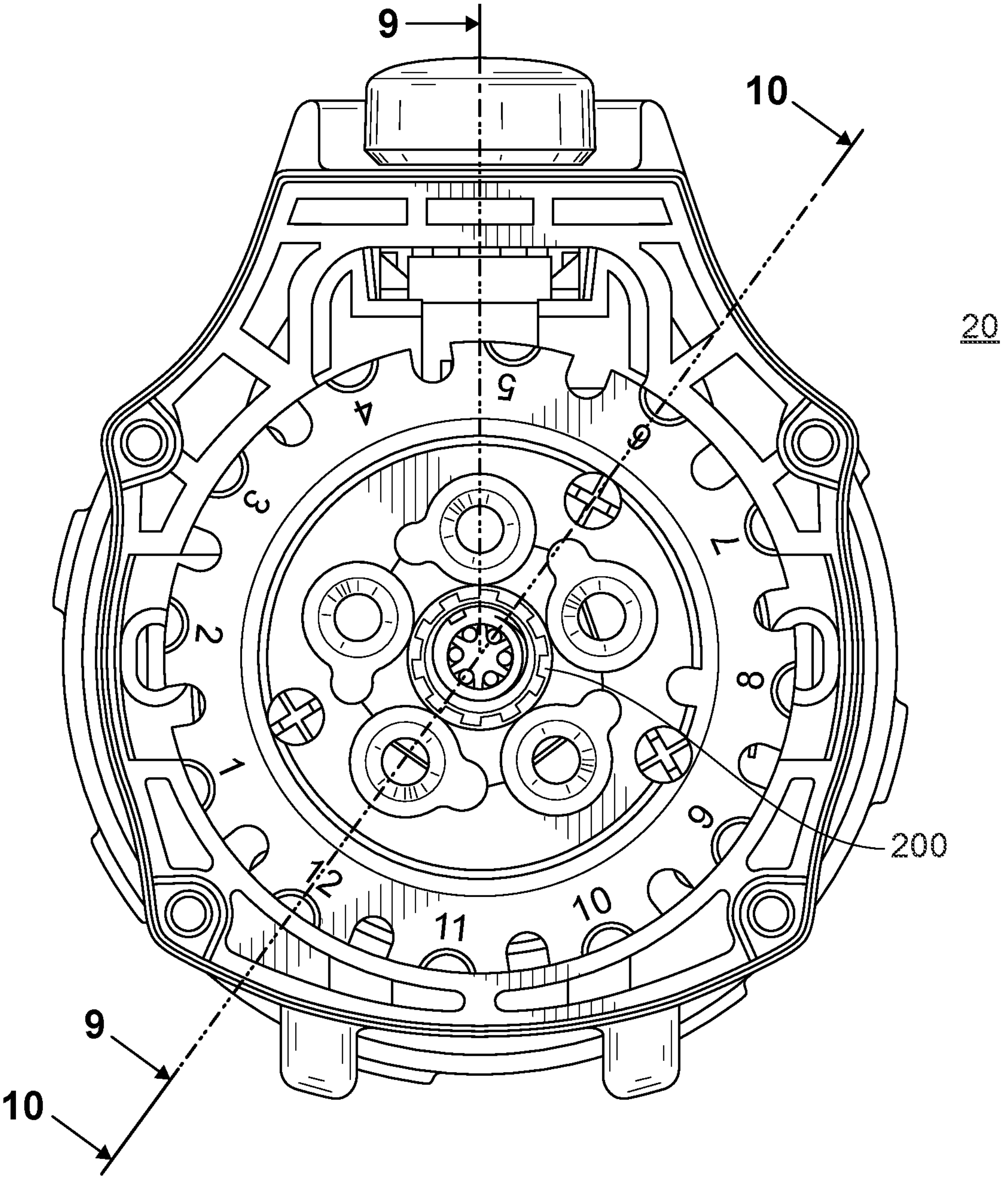
FIG. 8 is an end view of a receptacle including an auxiliary contact assembly according to an embodiment of the disclosure.
Figure 9A:
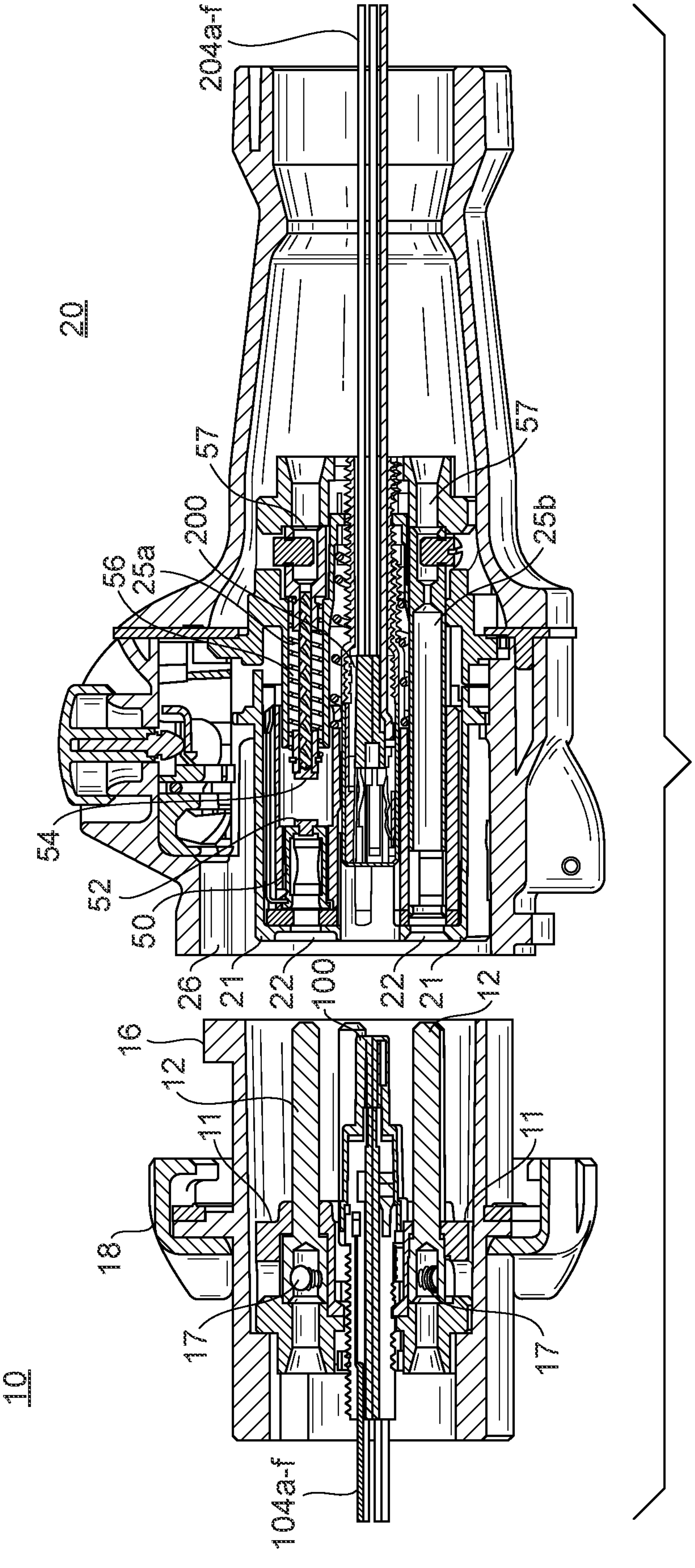
FIG. 9A is a cross section view a plug and receptacle including an auxiliary contact assembly according to an embodiment of the disclosure with the plug and receptacle disconnected.
Figure 9B:
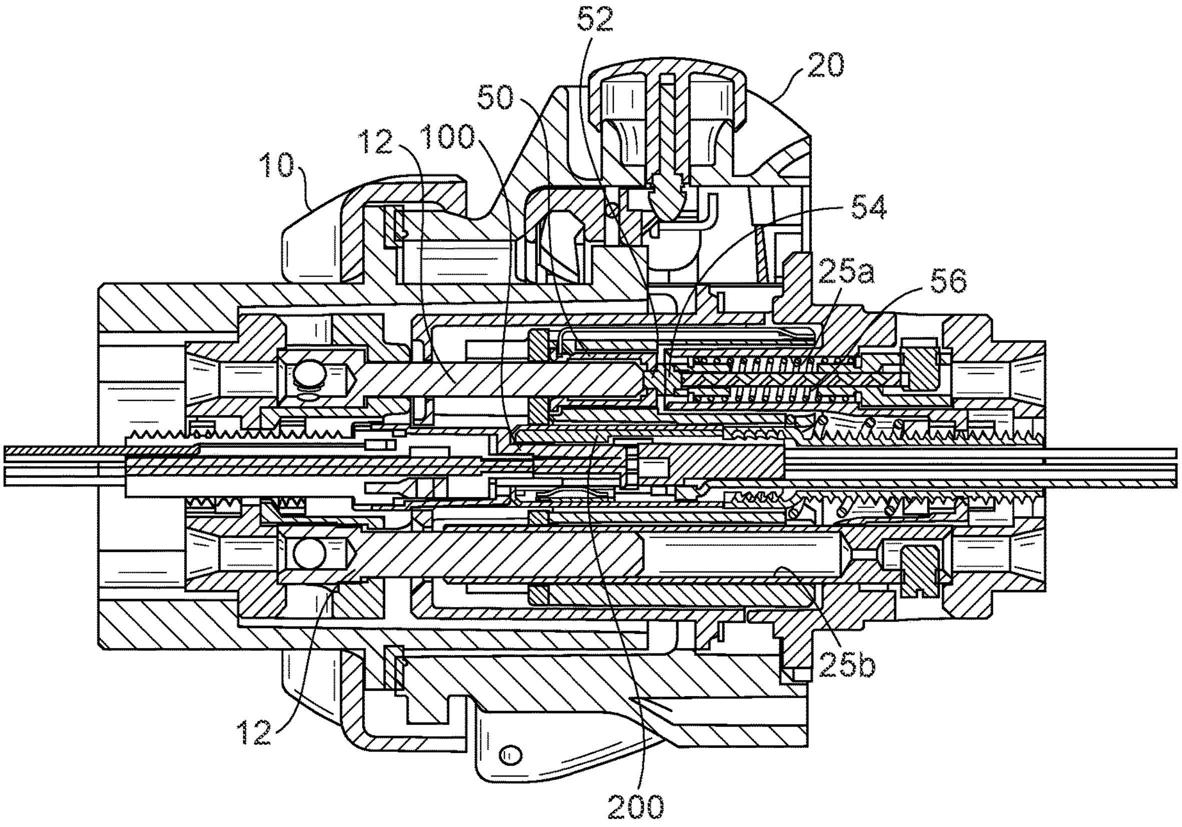
FIG. 9B is a cross section view a plug and receptacle including an auxiliary contact assembly according to an embodiment of the disclosure with the plug and receptacle connected.

FIG. 8 shows an end view of receptacle 20. FIG. 9A shows a cross section view of the plug 10 and receptacle 20 along the cut line indicated in FIG. 8 with the plug and receptacle disengaged. FIG. 9B shows that same cross section with the plug and receptacle engaged with one another.

Load-side auxiliary contact assembly 100 is positioned along the centerline of plug 10. Load power electrodes 12 are arranged parallel to assembly 100 and extend perpendicular to load side contacting surface 11. When plug 10 is fully inserted into receptacle 20, load side contacting surface 11 and line side contacting surface 21 abut one another. Load power electrodes 12 include set screw and terminal block portions 17 at their distal ends to connect with cables (not shown) to deliver electrical power to a piece of industrial equipment. Load power electrodes 12 are fixed in a block of insulating material with suitable insulating and dielectric properties, for example, Teflon, to minimize capacitive coupling and current leakage between the electrodes.

Pigtail leads 104*a-f* connect with load-side auxiliary contacts on assembly 100, as will be explained below. The free ends of leads 104*a-f* may be connected with sensors, controllers, or other circuits on the industrial equipment to monitor and/or control the industrial equipment.

Receptacle 20 includes line-side auxiliary contact assembly 200 arranged along its centerline. Line-side assembly 200 extends parallel to line power electrode assemblies 25*a* and 25*b*. Other line power electrode assemblies not visible in this cross section may also be provided. Openings 22 in surface 21 are aligned with line power electrode assemblies 25*a*, 25*b* to allow load electrodes 12 to be inserted into the assemblies 25*a*, 25*b*. Line-side auxiliary contact assembly 200 has an open end to accept insertion of load-side auxiliary contact assembly 100. According to one embodiment, line-side auxiliary contact assembly 200 is recessed from surface 21. As will be explained below, by varying the amount the line-side auxiliary contact assembly is recessed, the order that power is applied to the equipment relative to when control signals are applied can be adjusted so that power is either "make first" and/or "make last" with respect to some or all of the auxiliary contacts.

As used in this disclosure, the terms "distal" and "proximal" refer to the directions further from and closer to, respectively, the source of line power. The term "load-side" refers to structures on the plug that are typically wired to the equipment being supplied with power (i.e., the load). The term "line-side" refers to structures connected with the receptacle that are typically wired to equipment associated with the source of power (i.e., the line). These terms are provided only for the sake of clarity and not of limitation. As will be appreciated by those of skill in the art, structures on the plug and receptacle can be reversed within the scope of the disclosure.

Line power electrode assemblies 25*a*, 25*b* extend parallel to line-side assembly 200 and are include set screw and terminal block portions 57 to connect with cables (not shown) to provide power to the industrial equipment. Pigtail leads 204*a-f* connect with contact electrodes on the inside surface of line-side auxiliary contact assembly 200 and can be connected with equipment that sends and/or receives controlling and/or monitoring signals to and/or from the industrial equipment.

FIG. 9B shows plug 10 and receptacle 20 coupled together. Load power electrodes 12 are inserted into line power electrode assemblies 25*a*, 25*b*. Load-side auxiliary contact assembly 100 is inserted into line-side auxiliary contact assembly 200. In this embodiment, line power electrode assembly 25*a* includes structures to facilitate the connection and disconnection of live electrical loads, including mechanisms to minimize arcing when the connection is established and broken and to safely contain arc flash. As shown in FIG. 9A, electrode assembly 25*a* includes a coupling 50 that slides along assembly 25*a* as load electrode 12 is inserted. Coupling 50 has a contactor 52 at its proximal end. Second contactor 54 is positioned proximal of coupling 50 and is supported by spring 56. As shown in FIG. 9B, when power electrode 12 is inserted into assembly 25*a* coupling 50 is pushed proximally so that contactor 52 contacts contactor 54, establishing an electrical connection between load power electrode 12 and line power electrode assembly 25*a*.

According to one embodiment, because line-side auxiliary contact assembly 200 is recessed relative to surface 22, load/line power electrical contact between contactors 52 and 54 occurs before load-side auxiliary contact assembly 100 is fully inserted into line-side assembly 200. Thus, according to this embodiment, electrical power is communicated from assembly 25*a* to electrode 12 before auxiliary contacts are made. This arrangement assures that electrical power is "make first" with respect to the auxiliary contacts. Further distal movement of plug 10 into receptacle 20 causes spring 56 to compress and brings assemblies 100 and 200 into full engagement, as shown in FIG. 9B. Likewise, when plug 10 is removed from receptacle 20, assemblies 100 and 200 disengage from one another before contacts 52 and 54 are separated, thus ensuring that electrical power is "break last" with respect to the auxiliary contacts. As will be explained below, by selecting the positions of the auxiliary contacts with respect to the load and line electrodes, a specific order of contacting can be provided.

Figure 10:
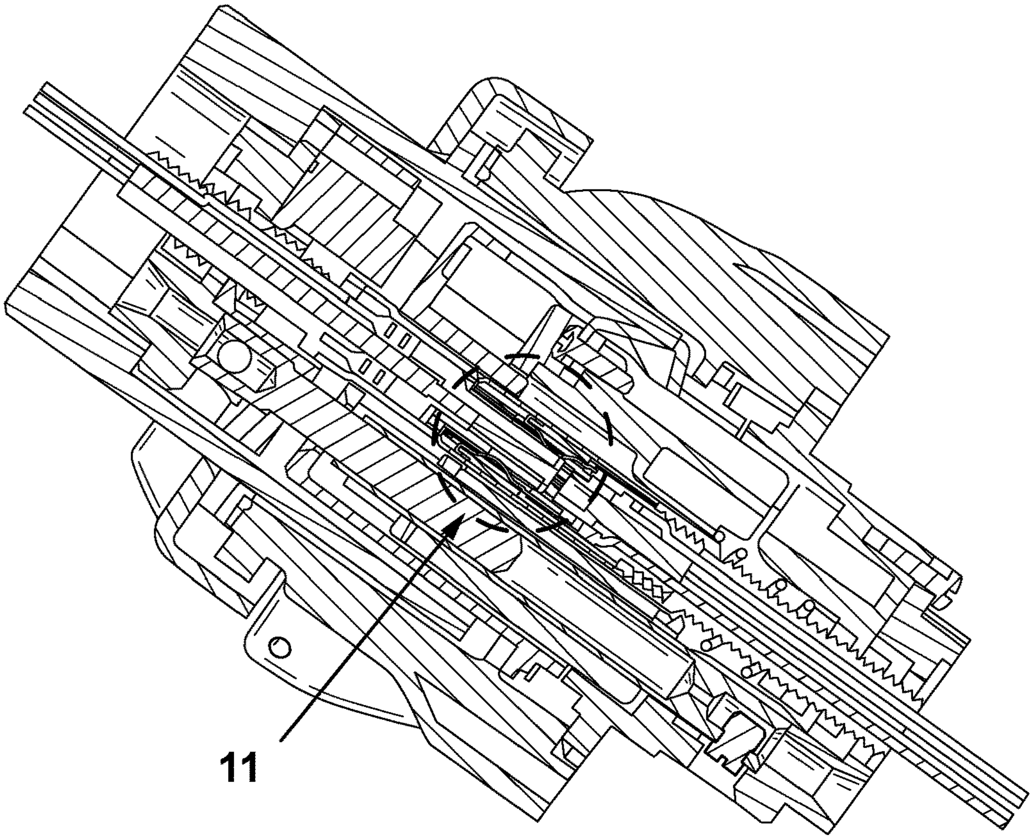
FIG. 10 is another cross section view a plug and receptacle including an auxiliary contact assembly according to an embodiment of the disclosure with the plug and receptacle connected.
Figure 11:
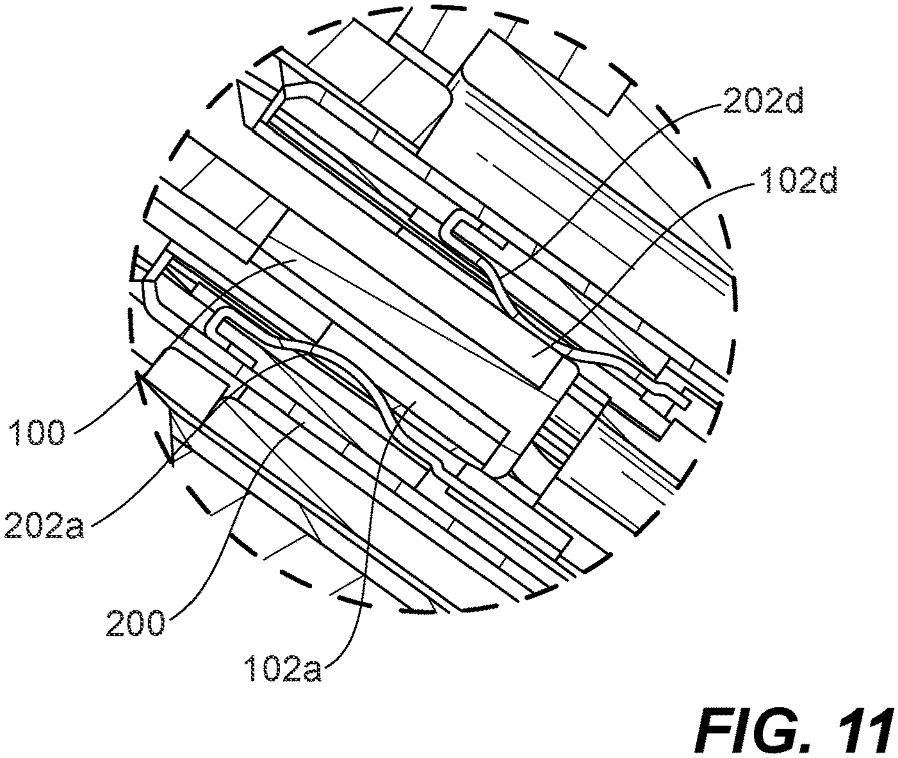
FIG. 11 is a detailed view of a portion of the cross section of FIG. 10.

FIG. 10 shows another cross section of plug 10 connected with receptacle 20. FIG. 11 shows a detailed view of the engagement of load-side auxiliary contact assembly 100 and line-side auxiliary contact assembly 200. Line-side auxiliary contact assembly 200 includes auxiliary contacts 202*a-f*, though only 202*a* and 202*d* are visible in these cross-section figures. When the assemblies are engaged, contacts 202*a-f* make electrical contact with contacts 102*a-f* on the load-side auxiliary contact assembly 100.

Contacts 202*a-f* are arranged around the inside surface of assembly 200. Adjacent contacts are staggered from one another along the length of assembly 200. By offsetting the contacts 202*a-f* radially and staggering them lengthwise on assembly 200, higher densities of contacts can be achieved while minimizing capacitive coupling between the contacts.

According to one embodiment, auxiliary contact assemblies 100 and 200 are formed as separate units apart from the plug 10 and receptacle 20 and can be added to an existing plug and receptacle, for example, to customize a commercially available plug and receptacle with auxiliary contacts.

Figure 12:
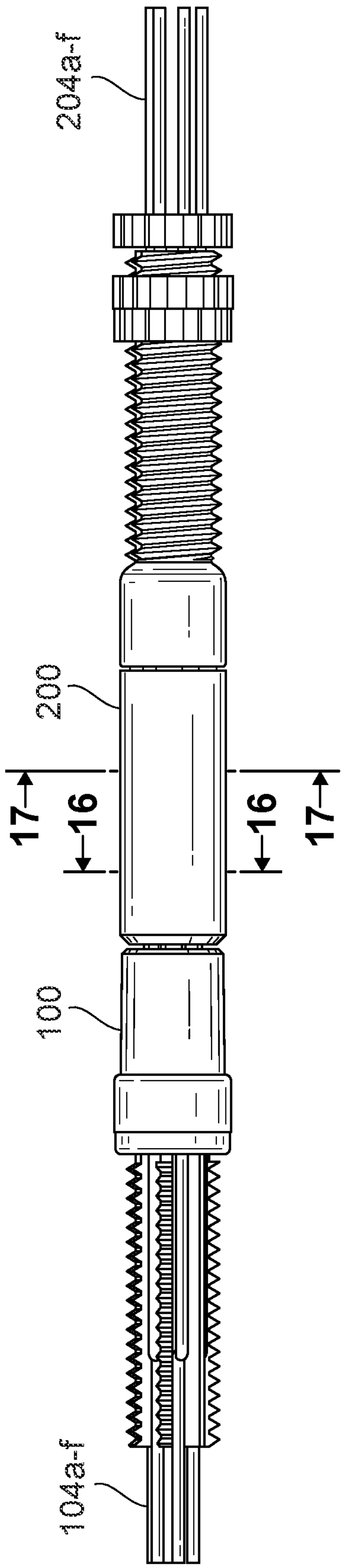
FIG. 12 is a side view of an auxiliary contact assembly according to an embodiment of the disclosure with line-side and load-side assemblies connected.
Figure 14:
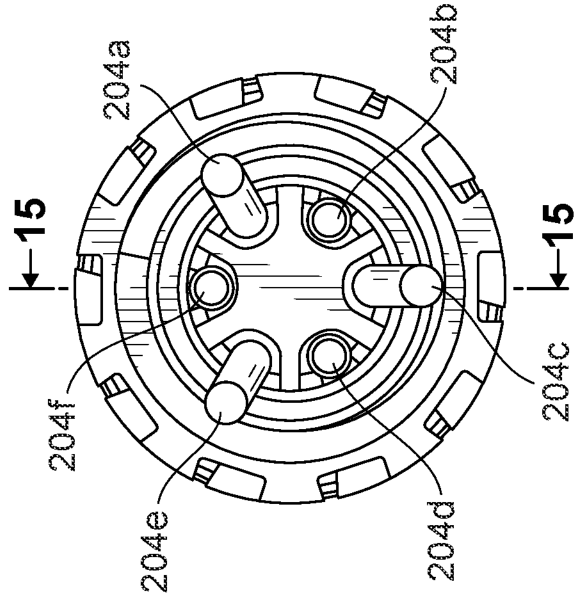
FIGS. 13 and 14 are end views of the assembly of FIG. 12.
Figure 13:
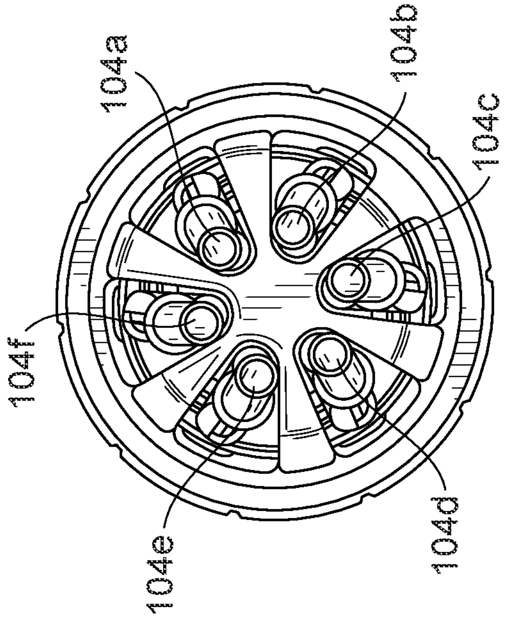

FIG. 12 shows a side view of assemblies 100 and 200 coupled together and separate from the plug and receptacle. FIG. 13 shows an end view of assembly 100. FIG. 14 shows an end view of assembly 200. Pigtail leads 104*a-f* and 204*a-f* extend from the assemblies, as discussed above.

Figure 15:
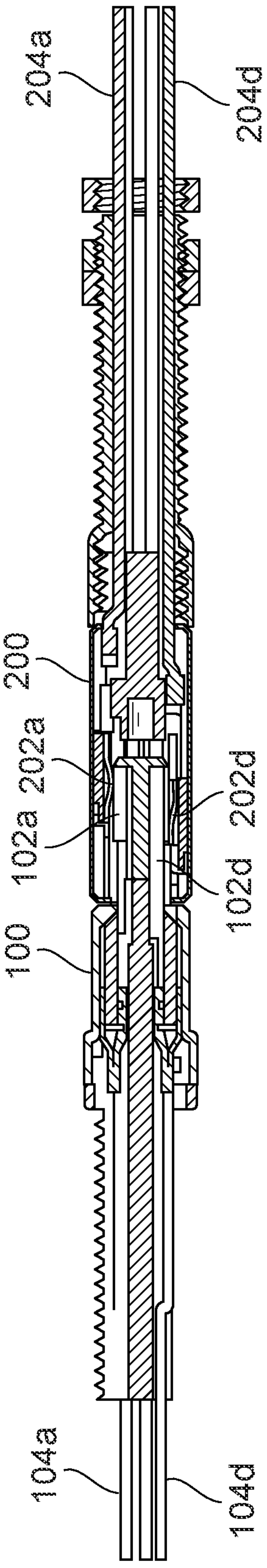
FIGS. 15-17 are a cross section views of the assembly of FIG. 12.

FIG. 15 shows a cross section of the coupled assemblies 100, 200 along the length of the assemblies. Electrodes 102*a* and 102*d* on load-side assembly 100 are in contact with electrodes 202*a* and 202*d* on line-side assembly 200. Load-side electrodes 102*b*, 102*c*, 102*e* and 102*f* are likewise in contact with respective electrodes 202*b*, 202*c*, 202*e*, and 202*f* on the line-side assembly, but are not visible in this cross section. Pigtail leads 104*a-f* are connected with electrodes 102*a-f* and leads 204*a-f* are connected with electrodes 202*a-f*.

Figure 17:
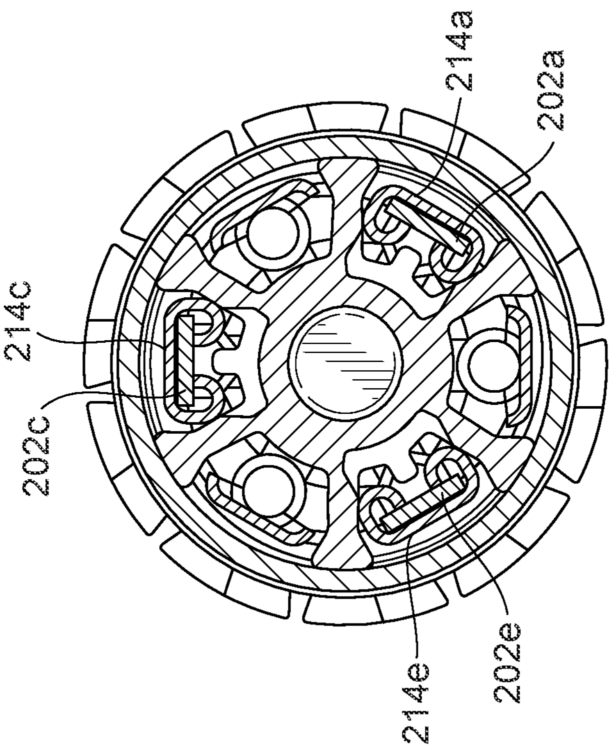
Figure 16:
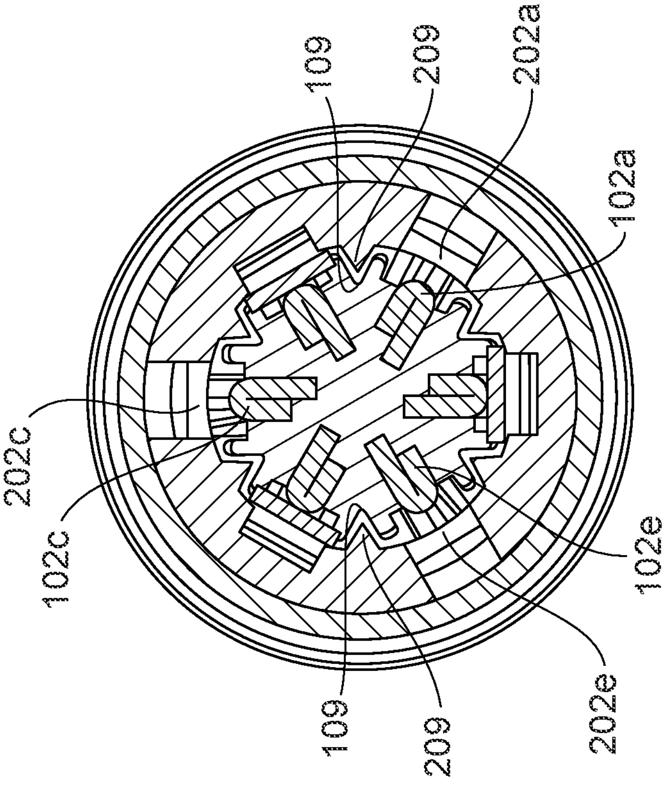

FIGS. 16 and 17 are cross sections of assemblies 100, 200 across their axes. FIG. 16 shows a cross section where electrodes 102*a*, 102*c*, and 102*e* engage with electrodes 202*a*, 202*c*, and 202*e*. Offset from the plane illustrated in FIG. 16 and not visible in the figure, load-side electrodes 102*b*, 102*d*, and 102*f* engage with line-side electrodes 202*b*, 202*d*, and 202*f*. Grooves 109 on assembly 100 engage with alignment ridges 209 on assembly 200 to guide the assemblies into alignment.

In this embodiment six sets of auxiliary contact electrodes are illustrated. A greater or fewer number of electrodes could be provided within the scope of the disclosure. In addition, in this embodiment, assemblies 100 and 200 are shown as having six sides and forming hexagonal shapes. A greater or fewer number of sides could be provided within the scope of the disclosure and the shape of the engaging assemblies could be polygonal, circular, or have an irregular shape.

FIG. 17 shows a cross section of the coupled assemblies 100, 200 where pigtail leads 204*a*, 204*c*, and 204*e* connect with electrodes 202*a*, 202*c*, and 202*e* via connectors 214*a*, 214*c*, and 214*e*, respectively.

Figure 18:
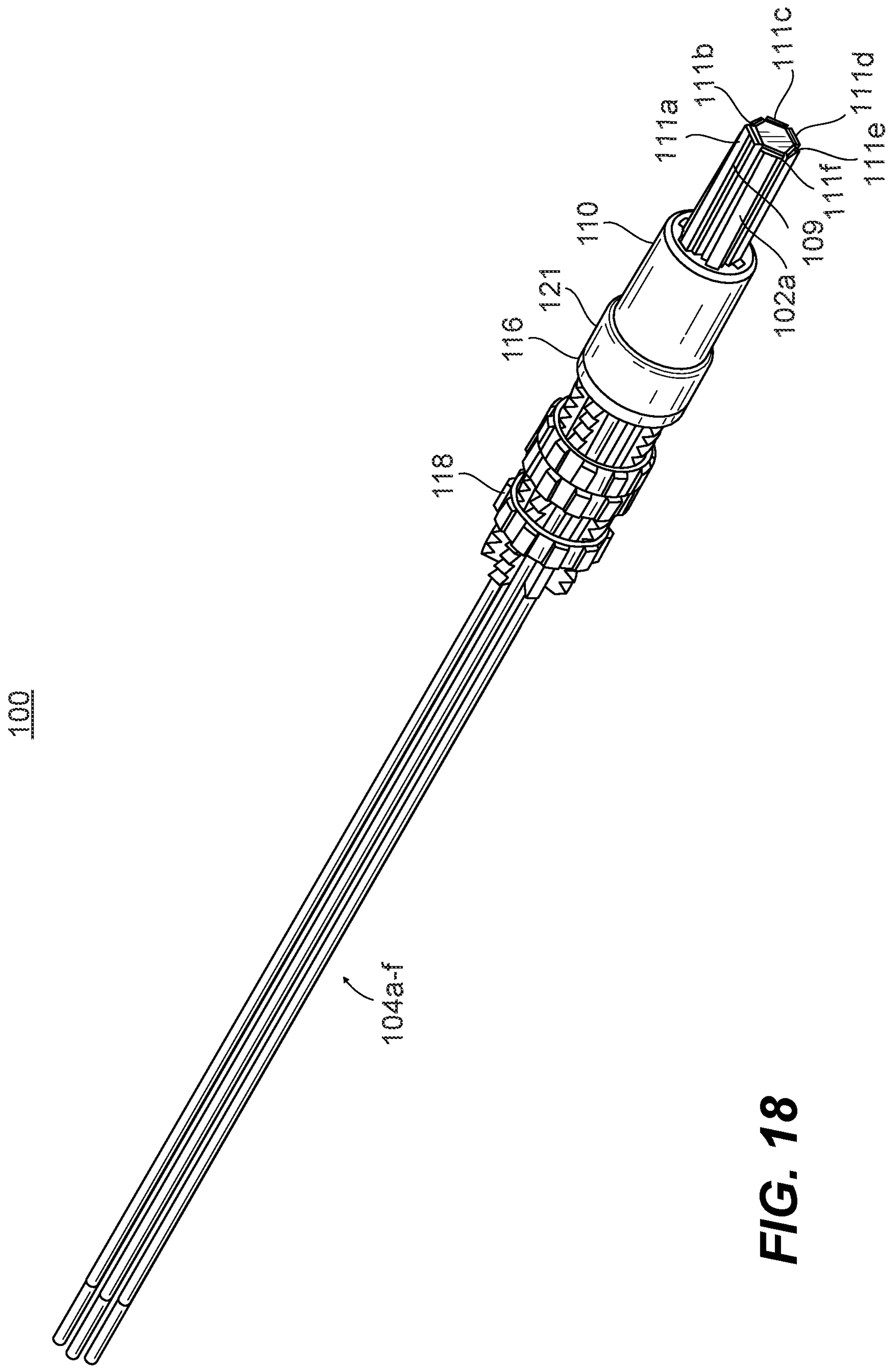
FIG. 18 is a perspective view of a load-side auxiliary contact assembly according to an embodiment of the disclosure.
Figure 19:
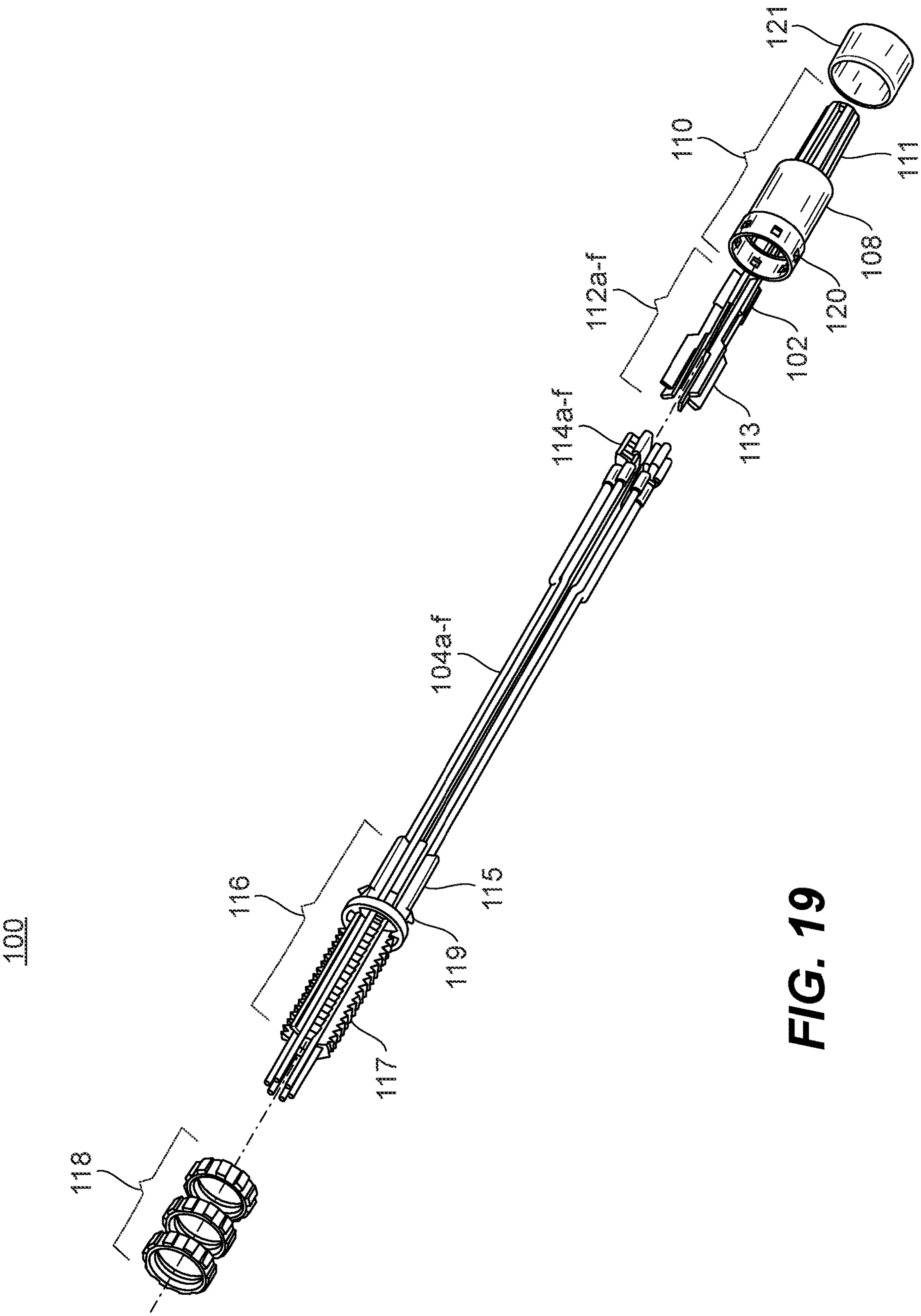
FIG. 19 is an exploded view of the load-side auxiliary contact assembly of FIG. 18.
Figure 20:
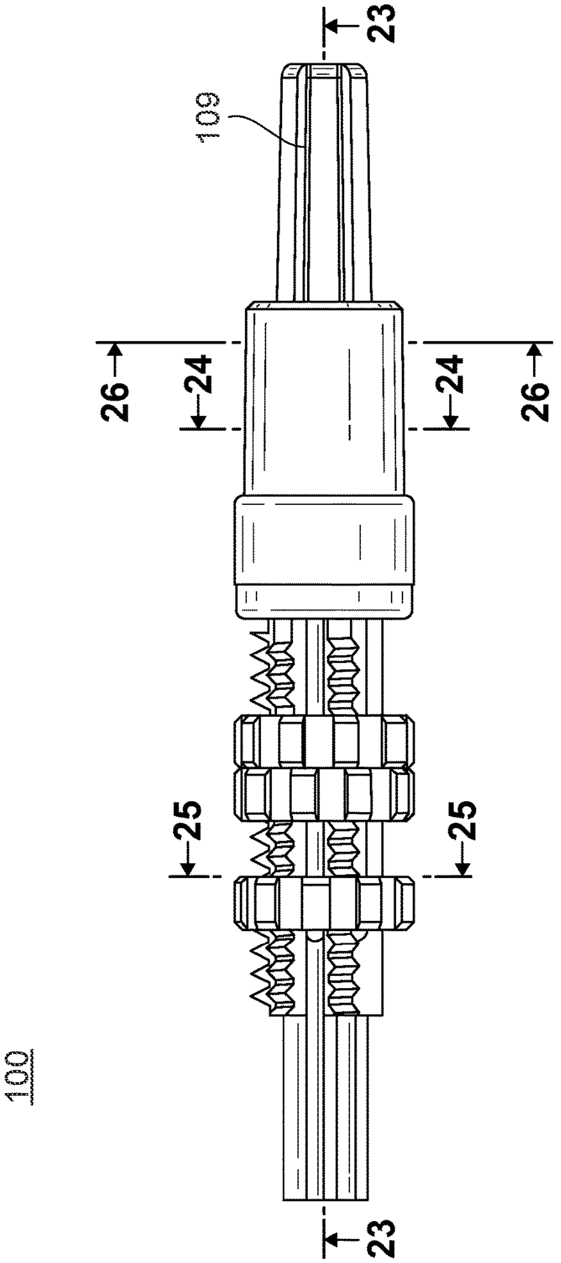
FIG. 20 is a side view of the assembly of FIG. 18.

FIG. 18 shows a perspective view of load-side auxiliary contact assembly 100 separate from plug 10. FIG. 19 is an exploded view of assembly 100. Contactor housing 110 includes a cylindrical support body 108 and slotted contact holder 111. Contact electrodes 112*a-f* each include a connector end 113 and a contact area 102. Contact areas 102 of the contact electrodes 112*a-f* are fitted into slots provided on the outer side surfaces 111*a*-111*f* of the support body on the slotted portion 111 of contact housing 110. The exposed portions of contact areas 102 form contact electrodes 102*a-f*. According to one embodiment, contact electrodes 102*a-f* extend along the length of slotted portion 111. As shown in FIG. 20, alignment grooves 109 are formed in housing 110 between the exposed contacts. Pigtail leads 104*a-f* are connected with connector ends 113 of contact electrodes 112*a-f* via connectors 114*a-f*. Leads 104*a-f* extend through rear housing 116.

Rear housing 116 includes a bladed portion 115 and a threaded portion 117. Spaces between the blades of the bladed portion 115 are shaped to accommodate the ends of electrodes 112*a-f* and connectors 114*a-f*. Snap tabs 119 on rear housing 116 snap into holes 120 on contactor housing 110 to secure the rear housing to the contactor housing. Shrink tubing 121 is fitted over contactor housing 110 and heat is applied to shrink the tubing and secure the rear housing 119 and contactor housing 110 together. Locking nuts 118 are fitted over leads 104*a-f* and threaded onto the threaded portion 117 of the rear housing 116.

Figure 22:
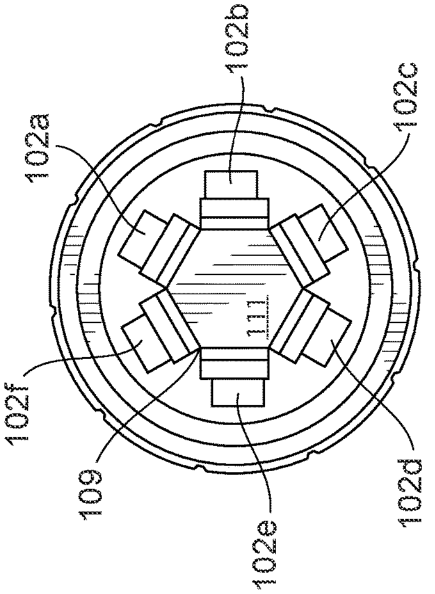
FIGS. 21 and 22 are end views of the assembly of FIG. 20.
Figure 21:
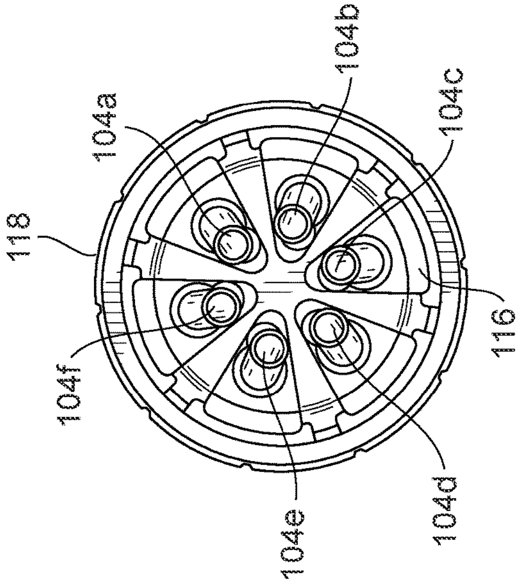

FIG. 20 shows a side view of load-side auxiliary contact assembly 100. FIGS. 21 and 22 show end views of the assembly. FIGS. 23-26 are cross sections of the assembly 100 as indicated by the cut lines in FIG. 20. FIG. 21 shows six pigtail leads 104*a-f* extending from the distal end of the assembly. The leads are separated from one another by rear assembly 116. Locking nut 118 is threaded onto the threaded portion 117 of rear housing 116. FIG. 22 shows the proximal end of assembly 100. The slotted portion 111 of contactor housing 110 holds contacts 102*a-f*.

Figure 23:
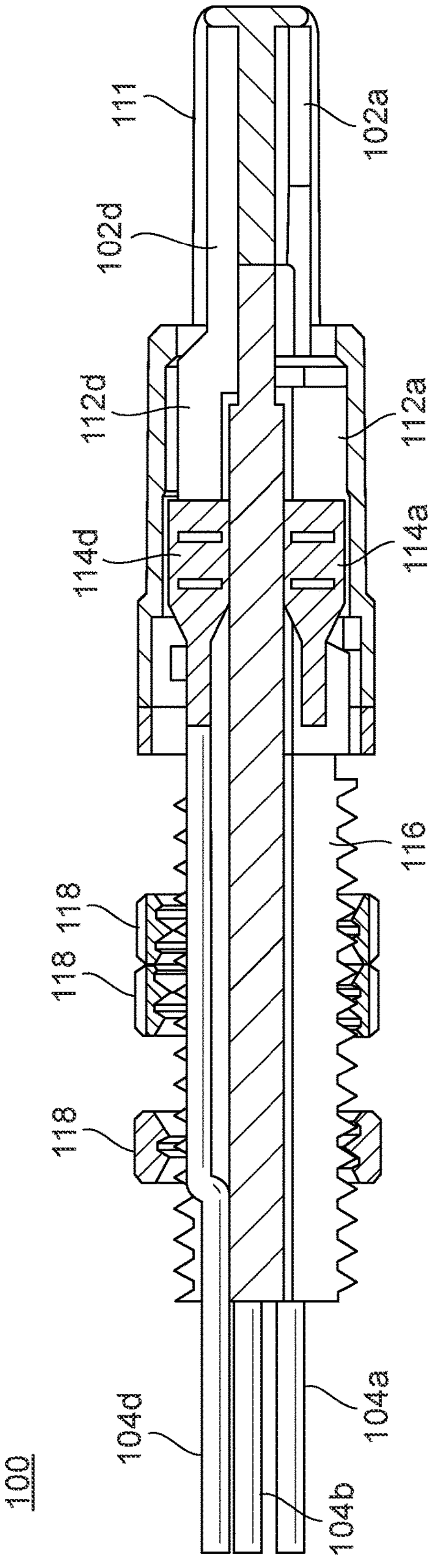
FIGS. 23-26 are cross section views of the assembly of FIG. 20.

FIG. 23 shows a cross section along the length of assembly 100. Contactor housing 110 supports contact electrodes 112*a-f* with contacts 102*a-f* exposed through the slots in slotted portion 111. Connectors 114*a-f* connect the electrodes with pigtail leads 104*a-f*.

Figure 24:
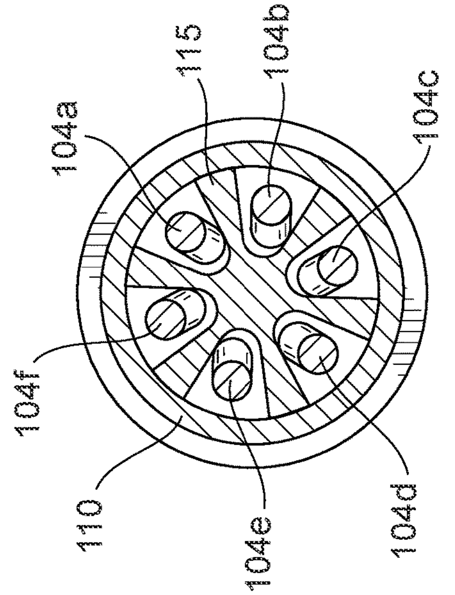
Figure 25:
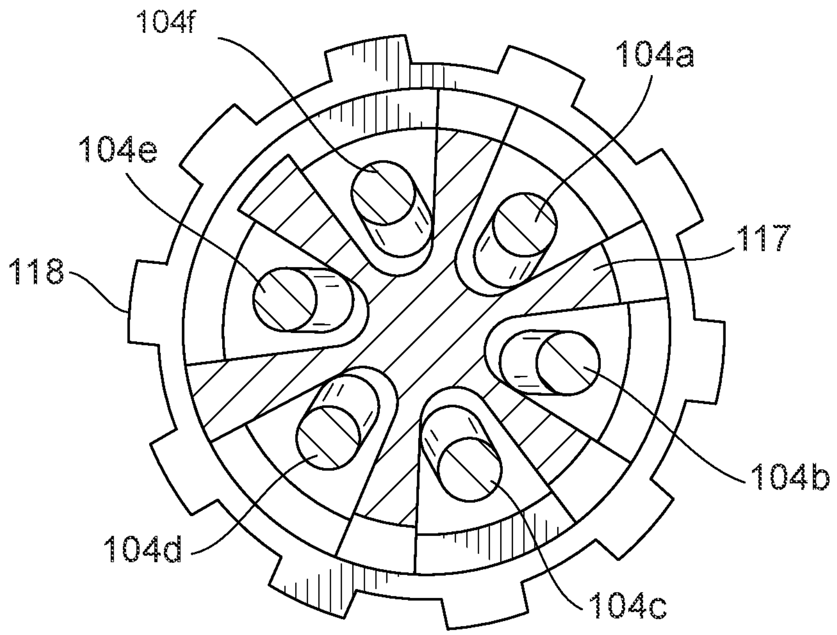
Figure 26:
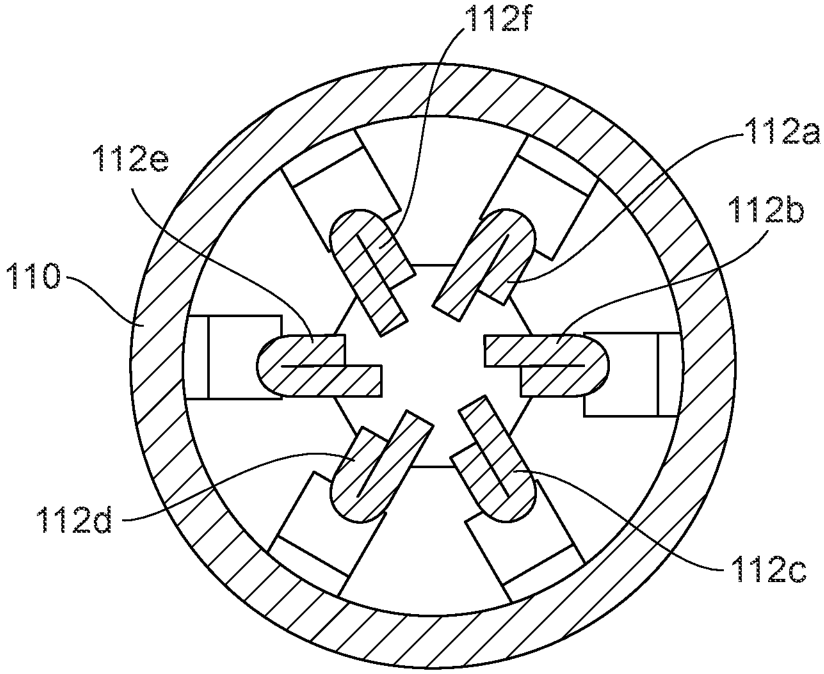

FIGS. 24, 25, and 26 shows cross sections across the axis of assembly 100. As shown in FIGS. 24 and 25, leads 104*a-f* are separated from one another by blades on the bladed portion 115 and threaded portion 117 of rear housing 116. Rear housing 116 may be made from a material with a low dielectric constant to reduce capacitive coupling between leads 104*a-f* and improve the quality of signals communicated through the assembly.

Figure 27:
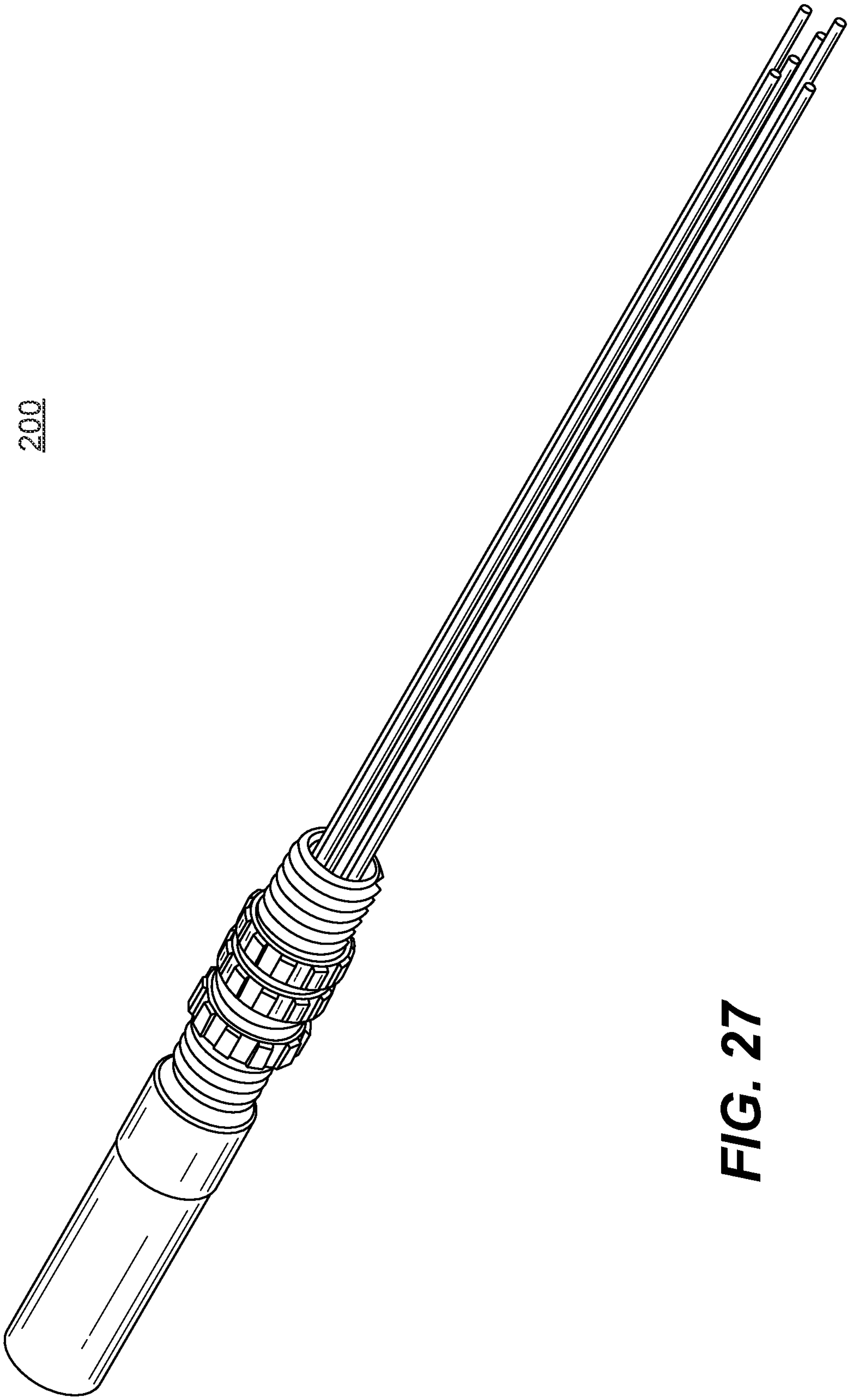
FIG. 27 is a perspective view of a line-side auxiliary contact assembly according to an embodiment of the disclosure.
Figure 28:
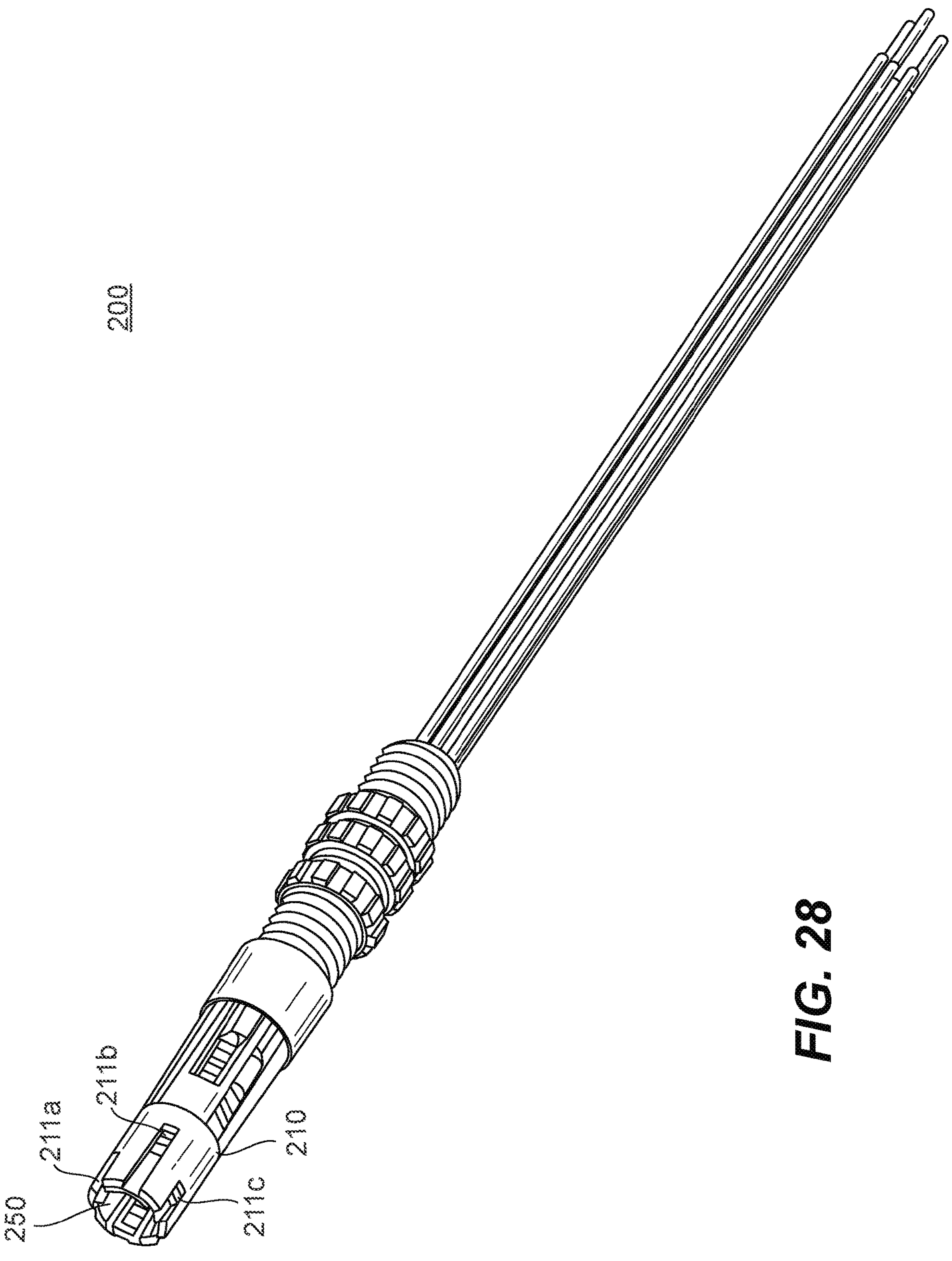
FIG. 28 is a perspective view of the line-side auxiliary contact assembly of FIG. 27 with a portion removed to show an internal structure.
Figure 29:
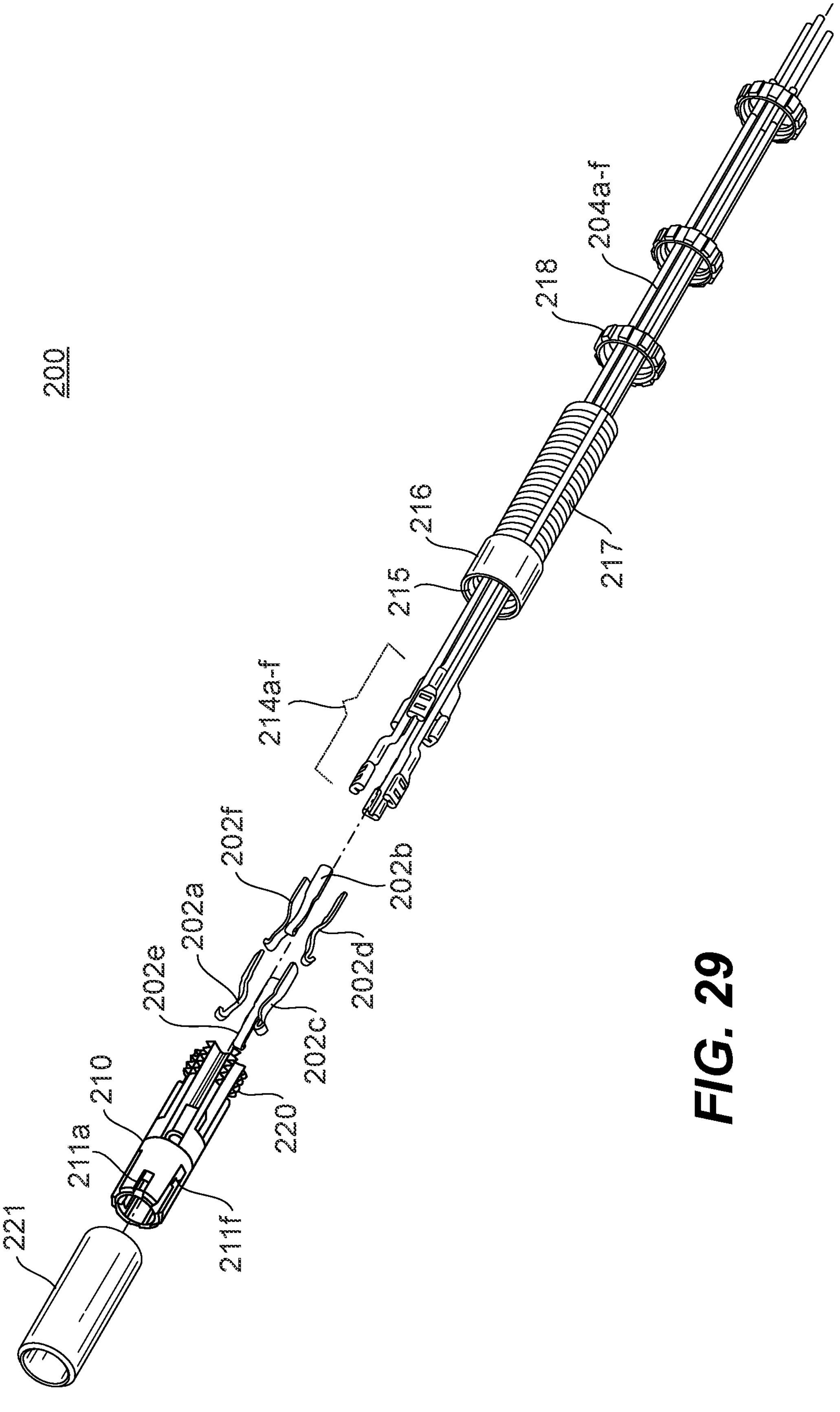
FIG. 29 is an exploded view of the line-side auxiliary contact assembly of FIG. 27.
Figure 33:
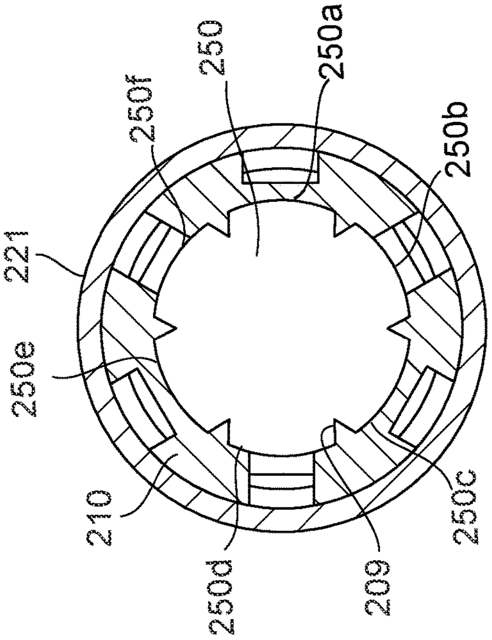

FIG. 27 is a perspective view of line-side auxiliary contact assembly 200. FIG. 28 is a perspective view of a partially disassembled line-side assembly 200. FIG. 29 is an exploded view of the assembly. As shown in FIG. 28, front housing 210 includes an inside surface or cavity 250 and is provided with slots 211*a-f* (though only slots 211*a, b*, and *c* are visible in FIG. 28). As depicted in FIG. 33, the inside surface of cavity 250 includes a plurality of inner side surfaces 250*a*-250*f*. The inner side surfaces 250*a*-250*f* correspond with the outer side surfaces 111*a*-111*f* of the support body 108. As shown in FIG. 29, these slots engage with the hooked ends of contacts 202*a-f* to hold the contacts along the inside surface of housing 210. According to one embodiment, slots 211*a-f* are arranged in a staggered arrangement with slots 211*a*, 211*c*, and 211*e* closer to the distal end of the housing and slots 211*b*, 211*d*, and 211*f* farther from the distal end of the housing. This arrangement allows the contacts to be more compactly arranged than if they were all positioned side-by-side.

In this embodiment, the six contacts are alternately staggered, but the disclosure is not limited to this arrangement. A greater or fewer number of contacts could be provided. One or more adjacent pairs of contacts could be positioned side-by-side. The contacts could be staggered in a different pattern, for example, with each contact positioned at a different unique distance from the distal end of the housing.

As shown in FIG. 29, contacts 202*a-f* may be referred to as leaf-spring contacts and have a bow-shaped portion and may be formed from a resilient material, for example, copper, silver, gold, beryllium, or other metal or alloy. As shown, for example, in FIGS. 11 and 32, the bowed portion of the contactors extend radially inward of front housing 210. Because contacts 202*a-f* are made from a flexible metal, the bowed portions elastically deform when they are pressed against contacts 102*a-f* on the load-side assembly 100 to provide a resilient and stable electrical contact.

Contacts 202*a-f* are connected with pigtail leads 204*a-f* by connectors 214*a-f*. Leads 204*a-f* extend through rear housing 216. An inner threaded portion 215 of rear housing 216 engages with outer threaded portion 220 of front housing 210 to secure the housings together. Lock nuts 218 are threaded onto outer thread 217 of rear housing 216. Shrink tubing 221 is fitted over the front and rear housings and heated to shrink it to secure the assembly 200.

Figure 30:
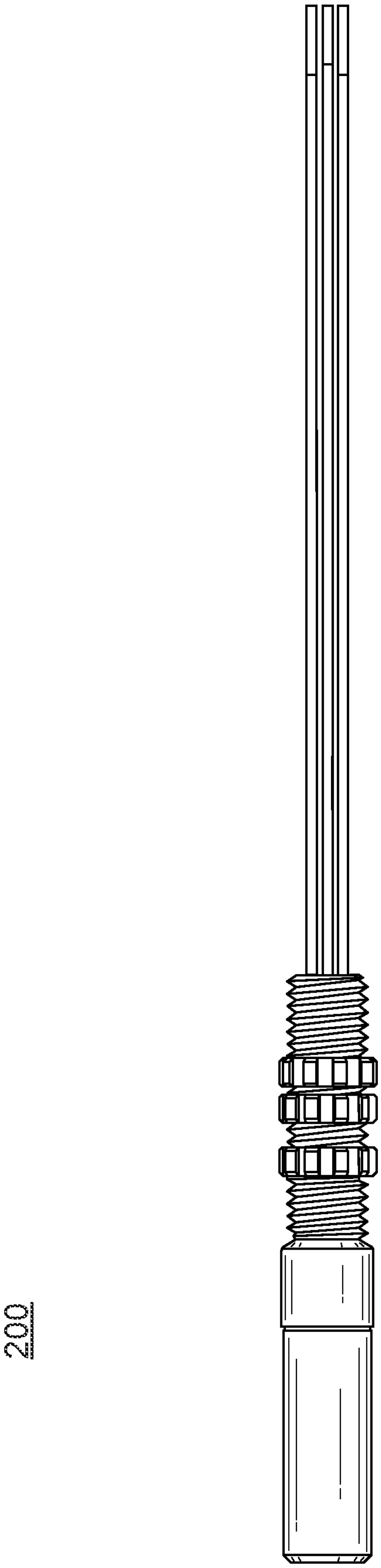
FIGS. 30 and 31 are side views of the assembly of FIG. 27.
Figure 31:
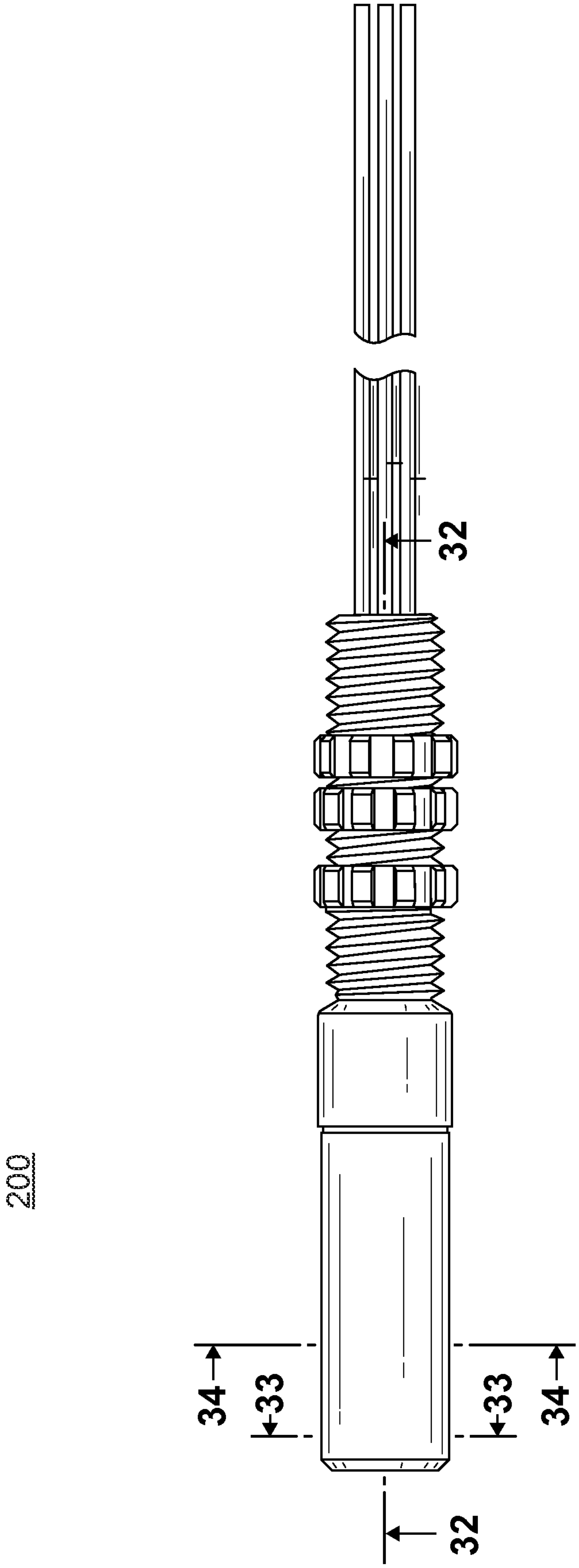
Figure 32:
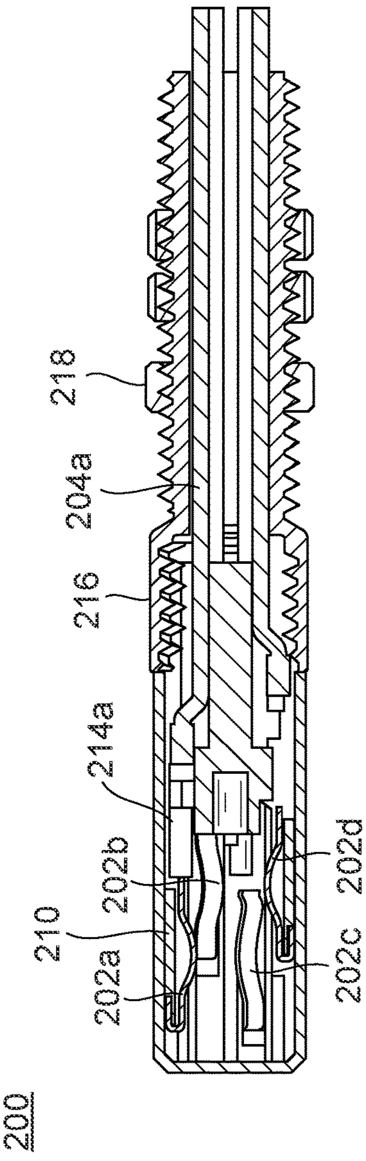
FIGS. 32-34 are cross section views of the assembly of FIG. 27.

FIGS. 30 and 31 shows side views of assembly 200. FIG. 32 shows a cross section of assembly 200 along its length. Contacts 202*a* and 202*c* are hooked into slots in front housing 210 near the distal end of the housing. Contacts 202*b* and 202*d* are hooked into slots in housing 210 farther from the distal end of the housing. Not shown in this figure, contact 202*e* is hooked into a slot near the distal end of the housing and contact 202*f* is hooked into a slot further from the distal end.

Figure 34:
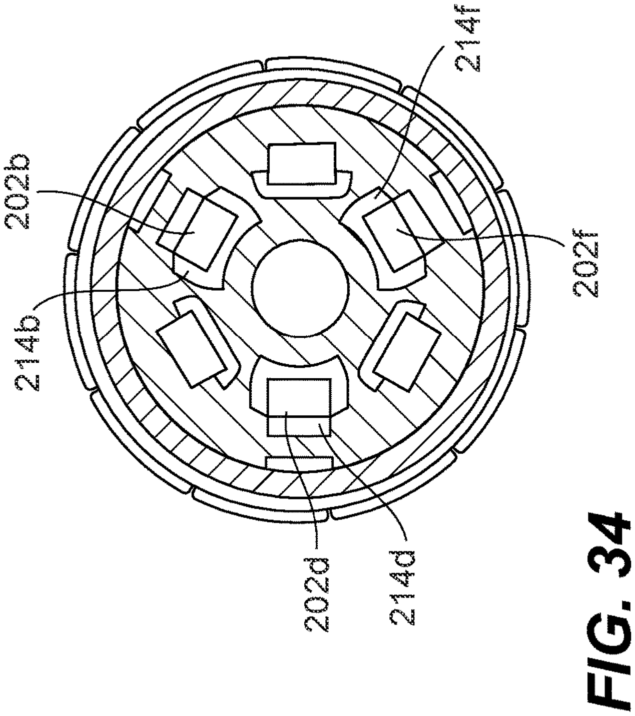

FIGS. 33 and 34 show cross sections of assembly 200 across its axis. As shown in FIG. 33, housing 210 includes alignment ridges 209 along its inner surface. Ridges 209 fit into grooves 109 on contact housing 110 of assembly 100 when assemblies are fitted together, such as when plug 10 is inserted into receptacle 20. Ridges 209 and grooves 109 maintain the proper alignment of contacts 102*a-f* on assembly 100 and contacts 202*a-f* on assembly 200.

FIG. 34 shows a cross section across the axis of assembly 200 further from the distal end of the assembly than FIG. 33. Connectors 214*b*, 214*d* and 214*f* are shown engaging with their respective contacts 202*b*, 202*d*, and 202*f*. Because of the staggered arrangement of contacts, connectors 214*a*, 214*c*, and 214*e* are offset from these connectors and not visible in this figure. Offsetting the connectors may be advantageous as it allows the connectors to be more compactly fit into the assembly and may reduce the size of the assembly.

According to a further embodiment of the disclosure, when plug 10 is inserted into receptacle 20, as shown in FIGS. 9A and 9B, assembly 100 is inserted into assembly 200. Contacts 202*a*, 202*c*, and 202*e*, which are arranged nearer to the distal end of front housing 210 make contact with respective contacts 102*a*, 102*c*, and 102*e* before the other auxiliary contacts. As assembly 100 is inserted farther into assembly 200, contacts 102*b*, 102*d*, and 102*f* connect with respective contacts 202*b*, 202*d*, and 202*f*. According to this embodiment, signals carried by contacts 102*a, c*, and *e* are communicated to and from the equipment before the signals on contacts 102*b, d*, and *f*. Likewise, when plug 10 and receptacle 20 are separated, contacts 102*b, d*, and *f* are broken first as assembly 100 is removed from assembly 200. Thus, contacts 102*a, c*, and *e* are "make first" and "break last" with respect to those contacts 102*b, e*, and *f*.

According to a further embodiment, the arrangement of contacts 202*a-f* within receptacle 20 is selected so that contact between line electrode assemblies 25*a*, 25*b* and the auxiliary contacts occurs in a specific order. For example, by arranging the relative positions of line electrode assemblies 25*a*, 25*b* and auxiliary contacts 202*a-f*, engagement between contacts 202*a, c*, and *e* and respective contacts 102*a, c*, and *e* occurs before engagement between the load and line electrodes, followed by engagement contacts 202*b, d*, and *f* and their respective contacts 102*b, d*, and *f*. With is arrangement, one set of contacts, 202*a, c, e* is "make first/break last" with respect to the line/load connection and the other set of contacts 202*b, d*, and *f* are "make last/break first" with respect to the line/load connection. According to this embodiment, a user can choose whether signals sent through the auxiliary connections are "make first" or "make last" by selecting which pigtail leads 104*a-f*/204*a-f* to use to communicate the signal.

While illustrative embodiments of the disclosure have been described and illustrated above, it should be understood that these are exemplary of the disclosure and are not to be considered as limiting. Additions, deletions, substitutions, and other modifications can be made without departing from the spirit or scope of the disclosure. Accordingly, the disclosure is not to be considered as limited by the foregoing description.

We claim:

1. An auxiliary contact assembly for an industrial connector comprising:

a line side contact assembly comprising:

a cavity elongated in a proximal direction, having an open distal end, and having a plurality of inner side surfaces; and a plurality of line side contacts arranged on the inner side surfaces of the cavity, wherein at least two of the line side contacts are on separate non-adjacent inner side surfaces at a first distance from the distal end of the cavity and wherein at least one of the plurality of line side contacts is on an inner side surface between the separate non-adjacent inner side surfaces and at a second distance from the distal end; and a load side contact assembly comprising:

a support body having a plurality of outer side surfaces and being elongated in the proximal direction, wherein the support body is shaped to be inserted into the cavity and wherein the outer side surfaces of the support body correspond with the inner side surfaces of the cavity; and a plurality of load side contacts arranged on one or more outer side surfaces of the body and positioned to contact corresponding ones of the plurality of line side contacts when the support body is inserted into the cavity, wherein the cavity comprises six inner side surfaces, wherein a first set of three of the line side contacts are on three non-adjacent inner side surfaces at the first distance from the distal end, wherein a second set of three line side contacts are on the three remaining inner side surfaces at the second distance from the distal end.

2. The assembly of claim 1, wherein the line side contacts comprise leaf springs, and wherein, when the body is inserted into the cavity, the load side contacts deflect the leaf springs.

3. The assembly of claim 1, further comprising a plurality of line side wires connected with the line side contacts and a plurality load side wires connected with the load side contacts.

4. The assembly of claim 3, wherein the line side wires are connected with the line side contacts by spade connectors and wherein the spade connectors on the line side electrodes at the first distance from the distal end are offset in the distal direction from the connectors on the load side electrodes at the second distance from the distal end.

5. The assembly of claim 1, wherein the cavity further comprises a first set of hook engaging slots, at least two of the slots disposed on the non-adjacent inner sides and at least one slot disposed on the inner side surface between the separate non-adjacent inner side surfaces, wherein the line side contacts each further comprise a hook and wherein the hooks of the line side contacts are engaged with respective ones of the slots.

6. The assembly of claim 1, further comprising:

an electrical plug comprising:

a load side housing;

a load side contacting surface disposed across a portion of the housing, wherein the load side contacting surface supports the support body, and wherein the support body extends from the contacting surface in the proximal direction; and one or more load electrodes extending from the load side contacting surface in the proximal direction and parallel to the support body; and an electrical receptacle comprising:

a line side contacting surface, wherein the open distal end of the cavity forms an opening in the line side contacting surface and the cavity extends in the proximal direction from the line side contacting surface; and one or more line electrodes, wherein the line electrodes are disposed proximal of the line side contacting surface, and wherein one or more electrode openings in the line side contacting surface are aligned with corresponding ones of the line electrodes, wherein when the load side contacting surface is moved toward the line side contacting surface the load electrodes insert into the electrode openings and the support body inserts into the cavity, and wherein the load electrodes contact the line electrodes and the load side contacts contact the line side contacts.

7. The assembly of claim 6, wherein, as the load side contacting surface approaches the line side contacting surface, the load and line electrodes contact each other before the load side contacts and the line side contacts contact each other.

8. The assembly of claim 6, wherein, as the load side contacting surface approaches the line side contacting surface, the load and line electrodes contact each other after the load side contacts and the line side contacts contact each other.

9. The assembly of claim 6, wherein the at least two load side contacts form a first load side contact set, wherein the at least one load side contact forms a second load side contact set, and, as the load side contacting surface approaches the line side contacting surface, the load and line electrodes contact each other after the contacts of the first load side contact set contact their respective line side contacts and the load and line electrodes contact each other before the contacts of the second load side contact set contact their respective line side contacts.

10. The assembly of claim 6, wherein the wherein line and load electrodes conform to an industry standard configuration.

11. The assembly of claim 6, wherein the load side contact assembly is removably connected with the plug.

12. The assembly of claim 6, wherein the line side contact assembly is removably connected with the receptacle.

13. The assembly of claim 6, wherein the cavity further comprises a line side alignment feature extending in the proximal direction and disposed between two adjacent inner side surfaces, and wherein the support body further comprises a load side alignment feature extending in the proximal direction and disposed between adjacent outer side surfaces, wherein when the supporting body is inserted into the cavity, the load side alignment feature engages with the line side alignment feature to guide the load side contacts into engagement with the line side contacts.

14. An electrical receptacle comprising:

a line side contact assembly comprising:

a cavity elongated in a longitudinal direction having an open distal end having a plurality of inner side surfaces; and a plurality of line side contacts arranged on the inner side surfaces of the cavity, wherein at least two of the line side contacts are on separate non-adjacent inner side surfaces at a first distance from the distal end of the cavity and wherein at least one of the plurality of line side contacts is on an intervening inner side surface between the separate non-adjacent inner side surfaces and at a second distance from the distal end;

a housing surrounding the line side contact assembly;

a line side contacting surface disposed across a portion of the housing, wherein the open distal end of the cavity forms an opening in the line side contacting surface and the cavity extends in the proximal direction from the line side contacting surface;

one or more line electrodes disposed within the housing proximal of the line side contacting surface; and one or more electrode openings in the line side contacting surface, wherein the electrode openings corresponding to respective ones of the line electrodes.

15. The receptacle of claim 14, wherein the open distal end of the cavity is positioned at a central location on the line side contacting surface and wherein the electrode openings are positioned radially around the open distal end.

16. The receptacle of claim 14, wherein the line side contact assembly is removably connected with the receptacle.

17. An electrical plug comprising:

a load side contact assembly comprising:

a support body having a plurality of outer side surfaces having a proximal end and being elongated in the proximal direction, and a plurality of load side contacts arranged on the outer side surfaces of the body, wherein at least two of the load side contacts are on separate non-adjacent outer side surfaces at a first distance from the proximal end of the body and wherein at least one of the plurality of load side contacts is on an outer side surface between the separate non-adjacent outer side surfaces and at a second distance from the proximal end;

a load side contacting surface, wherein the body extends from the load side contacting surface in the proximal direction; and one or more load electrodes extending from the load side contacting surface in the proximal direction, wherein the support body is positioned at a central location on the load side contacting surface and wherein the load electrodes are positioned radially around the support body.

18. The plug of claim 17, wherein the load side contact assembly is removably connected with the plug.

* * * * *